US012586171B2

(12) United States Patent
Parsons et al.

(10) Patent No.: US 12,586,171 B2
(45) Date of Patent: Mar. 24, 2026

(54) METHODS AND SYSTEMS FOR GRADING DEVICES

(71) Applicant: Communications Test Design, Inc., West Chester, PA (US)

(72) Inventors: Mark Parsons, West Chester, PA (US); Nidhin Davis, Glen Mills, PA (US); Soham Patwardhan, West Chester, PA (US); Sujan Patel, West Chester, PA (US); Dustin Ho, West Chester, PA (US)

(73) Assignee: Communications Test Design, Inc., West Chester, PA (US)

( * ) Notice: Subject to any disclaimer, the term of this patent is extended or adjusted under 35 U.S.C. 154(b) by 412 days.

(21) Appl. No.: 17/955,837

(22) Filed: Sep. 29, 2022

(65) Prior Publication Data

US 2023/0153978 A1 May 18, 2023

Related U.S. Application Data

(60) Provisional application No. 63/280,449, filed on Nov. 17, 2021.

(51) Int. Cl.
*G06T 7/00* (2017.01)
*G06K 7/14* (2006.01)
*G06V 20/60* (2022.01)

(52) U.S. Cl.
CPC .......... *G06T 7/0004* (2013.01); *G06K 7/1413* (2013.01); *G06K 7/1417* (2013.01); *G06V 20/60* (2022.01); *G06V 2201/06* (2022.01)

(58) Field of Classification Search
CPC ............ G06T 7/0004; G06Q 10/06395; G06V 10/993; G06V 10/764; G06V 20/60
See application file for complete search history.

(56) References Cited

U.S. PATENT DOCUMENTS 10,402,964 B2 9/2019 Humphrey et al.
10,753,882 B1 * 8/2020 Mahajan .................. H04N 7/18
(Continued)

FOREIGN PATENT DOCUMENTS

CN 109447955 A * 3/2019 ........... G06T 7/0004
CN 110567965 A * 12/2019 ............. G06T 7/187
(Continued)

OTHER PUBLICATIONS

Changsheng Li, Xianmin Zhang, Yanjiang Huang, Chuangang Tang, Sergej Fatikow, A novel algorithm for defect extraction and classification of mobile phone screen based on machine vision, Computers & Industrial Engineering, vol. 146, 2020, 106530, ISSN 0360-8352 (Year: 2020).*
(Continued)

*Primary Examiner* — Michael Robert Cammarata
(74) *Attorney, Agent, or Firm* — Bradley M. Brown

(57) ABSTRACT

Methods and systems are disclosed for grading user devices (e.g., mobile devices, smartphones, IoT devices, electronic devices, etc.). Image data associated with one or more portions of a user device may be determined as the user device traverses a conveyor system. The image data may be analyzed and a graphical depiction of regions of the user device where defects are present may be generated to rank, score, and/or grade the user device and/or portions of the user device.

18 Claims, 29 Drawing Sheets

(56)  References Cited

U.S. PATENT DOCUMENTS

| | | | | |
|---|---|---|---|---|
| 2009/0242620 | A1* | 10/2009 | Sahuguet | G06Q 30/0278 |
| | | | | 709/201 |
| 2014/0267691 | A1* | 9/2014 | Humphrey | G06T 7/001 |
| | | | | 348/125 |
| 2018/0232875 | A1* | 8/2018 | Kanodia | G06T 7/0004 |
| 2019/0318465 | A1 | 10/2019 | Nguyen | |
| 2019/0335033 | A1 | 10/2019 | Huang | |
| 2020/0143528 | A1* | 5/2020 | Kulkarni | G06N 20/00 |
| 2020/0265487 | A1* | 8/2020 | Silva | G06V 10/141 |
| 2021/0116392 | A1* | 4/2021 | Fitzgerald | G06K 7/1417 |
| 2021/0192484 | A1* | 6/2021 | Forutanpour | G06Q 20/18 |

FOREIGN PATENT DOCUMENTS

| | | | | | |
|---|---|---|---|---|---|
| CN | 110570393 | A | * | 12/2019 | G01N 21/94 |
| CN | 110276752 | B | * | 4/2021 | G01B 11/00 |
| CN | 110163842 | B | * | 6/2021 | G06T 7/0004 |
| CN | 113538431 | A | * | 10/2021 | |
| TW | 202029071 | A | * | 8/2020 | G01N 21/8851 |
| WO | WO-2020257811 | A1 | * | 12/2020 | G01N 21/8851 |
| WO | 2021092297 | A1 | | 5/2021 | |

OTHER PUBLICATIONS

CTIA (CTIATM Wireless Device Grading Scales Criteria and Definitions, Version 1, Dec. 2018, retrieved from https://api.ctia.org/wp-content/uploads/2018/12/CTIA-Wireless-Device-Grading-Scales-Criteria-and-Definitions-Version-1.0.pdf); (Year: 2018).*
English translation of CN-110570393-A (Year: 2019).*
International Search Report and Written Opinion issued in application No. PCT/US22/48690 mailed Mar. 24, 2023.
Office Action Issued for corresponding Australian Patent Application No. 2022391619 dated Apr. 11, 2025.

* cited by examiner

DETERMINE IMAGE DATA ASSOCIATED WITH A MOBILE DEVICE

2420

DETERMINE A TYPE OF THE MOBILE DEVICE AND A PLURALITY OF REGIONS

2430

DETERMINE A NUMBER OF DEFECTS FOR EACH OF THE PLURALITY OF REGIONS

2440

DETERMINE A SCORE FOR EACH REGION OF THE PLURALITY OF REGIONS BASED ON THE NUMBER DEFECTS

2450

UPDATE A DEVICE PROFILE ASSOCIATED WITH THE MOBILE DEVICE

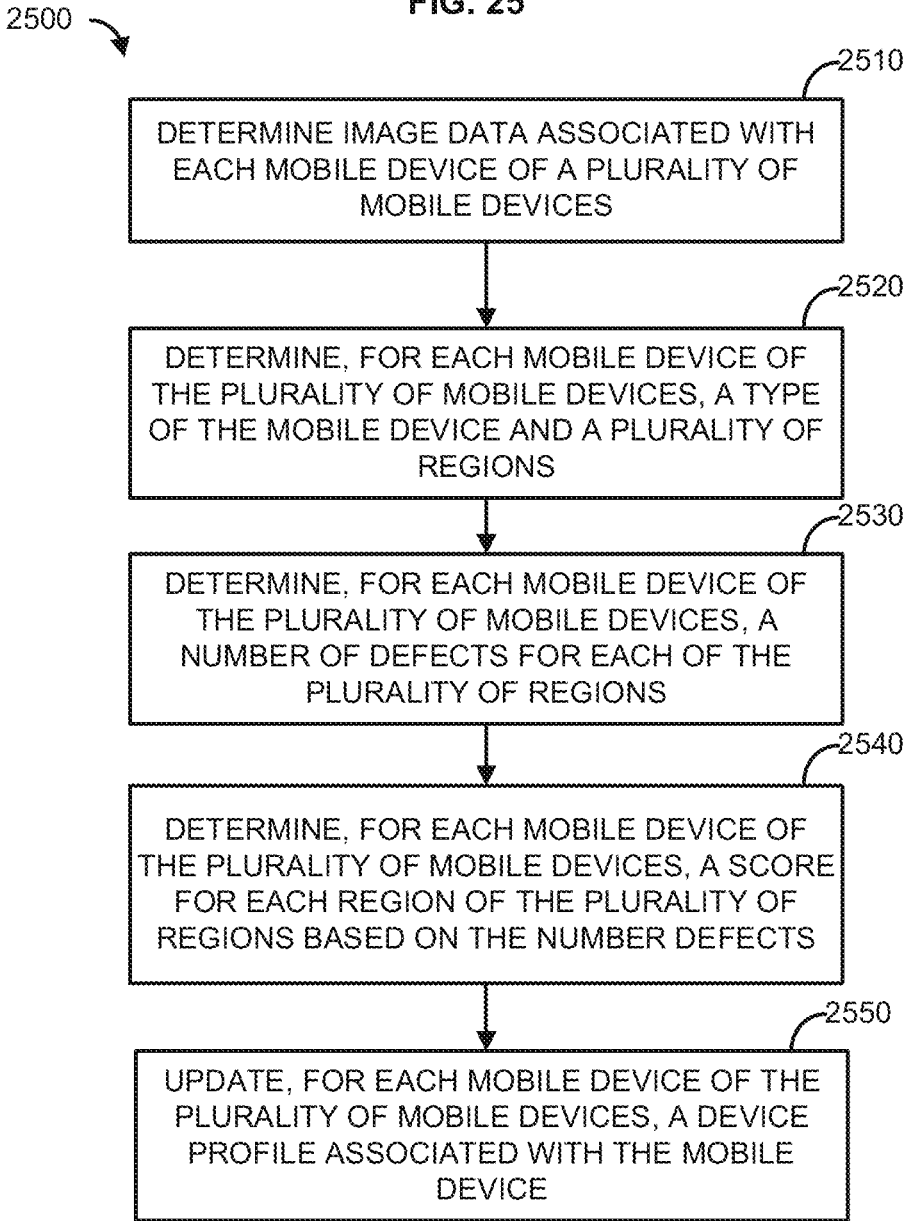

2510

DETERMINE IMAGE DATA ASSOCIATED WITH EACH MOBILE DEVICE OF A PLURALITY OF MOBILE DEVICES

2520

DETERMINE, FOR EACH MOBILE DEVICE OF THE PLURALITY OF MOBILE DEVICES, A TYPE OF THE MOBILE DEVICE AND A PLURALITY OF REGIONS

2530

DETERMINE, FOR EACH MOBILE DEVICE OF THE PLURALITY OF MOBILE DEVICES, A NUMBER OF DEFECTS FOR EACH OF THE PLURALITY OF REGIONS

2540

DETERMINE, FOR EACH MOBILE DEVICE OF THE PLURALITY OF MOBILE DEVICES, A SCORE FOR EACH REGION OF THE PLURALITY OF REGIONS BASED ON THE NUMBER DEFECTS

2550

UPDATE, FOR EACH MOBILE DEVICE OF THE PLURALITY OF MOBILE DEVICES, A DEVICE PROFILE ASSOCIATED WITH THE MOBILE DEVICE

2600

2610

DETERMINE IMAGE DATA ASSOCIATED WITH A MOBILE DEVICE

2620

DETERMINE A TYPE OF THE MOBILE DEVICE AND AN AESTHETIC DEFECT

2630

PREDICT A FUNCTIONAL DEFECT BASED ON THE AESTHETIC DEFECT

2640

DETERMINE A SCORE BASED ON THE PREDICTED FUNCTIONAL DEFECT

2650

UPDATE A DEVICE PROFILE ASSOCIATED WITH THE MOBILE DEVICE

METHODS AND SYSTEMS FOR GRADING DEVICES

CROSS REFERENCE TO RELATED PATENT APPLICATION

This application claims the benefit of priority to U.S. Provisional Application No. 63/280,449 filed Nov. 17, 2021, which is herein incorporated by reference in its entirety.

BACKGROUND

Mass production of user devices (e.g., mobile devices, smartphones, IoT devices, electronic devices, etc.) often results in a subset of the user devices failing to meet quality and/or functionality standards. For example, one or more user devices may be produced with defects and/or become damaged during processing (e.g., packaging, shipping, storing, etc.). Manual inspection of user devices to determine defects and/or damages is inefficient and error-prone, causing many defects and/or damages to be unidentified.

SUMMARY

It is to be understood that both the following general description and the following detailed description are exemplary and explanatory only and are not restrictive. Methods and systems for grading user devices (e.g., mobile devices, smartphones, IoT devices, electronic devices, etc.) are described.

Described are methods comprising: determining image data associated with a mobile device; determining, based on the image data, a type of the mobile device and a plurality of regions; determining, for each region of the plurality of regions, a number of defects; determining, for each region of the plurality of regions, a score, wherein the score is based on the type of the mobile device and one or more of: the region or the number of defects for the region; and updating, based on the score for each region of the plurality of regions, a device profile associated with the mobile device.

Also described are methods comprising: determining, for each mobile device of a plurality of mobile devices, image data; determining, for each mobile device of the plurality of mobile devices, based on the image data, a type of the mobile device and a plurality of regions; determining, for each mobile device of the plurality of mobile devices, for each region of the plurality of regions, a number of defects; determining, for each mobile device of the plurality of mobile devices, for each region of the plurality of regions, a score, wherein the score is based on the type of the mobile device and one or more of: the region or the number of defects for the region; and updating, for each mobile device of the plurality of mobile devices, based on the score for each region of the plurality of regions, a device profile associated with the mobile device.

Also described are methods comprising: determining image data associated with a mobile device; determining, based on the image data, a type of the mobile device and an aesthetic defect; predicting, based on the type of the mobile device and the aesthetic defect, a functional defect; determining, based on the predicted functional defect, a score; and updating, based on the score, a device profile associated with the mobile device.

Additional advantages will be set forth in part in the description which follows or may be learned by practice.

The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIGS. 5-19 show examples of grading user devices;

FIG. 25 is a flowchart of an example method for grading user devices;

DETAILED DESCRIPTION

Figure 1A:
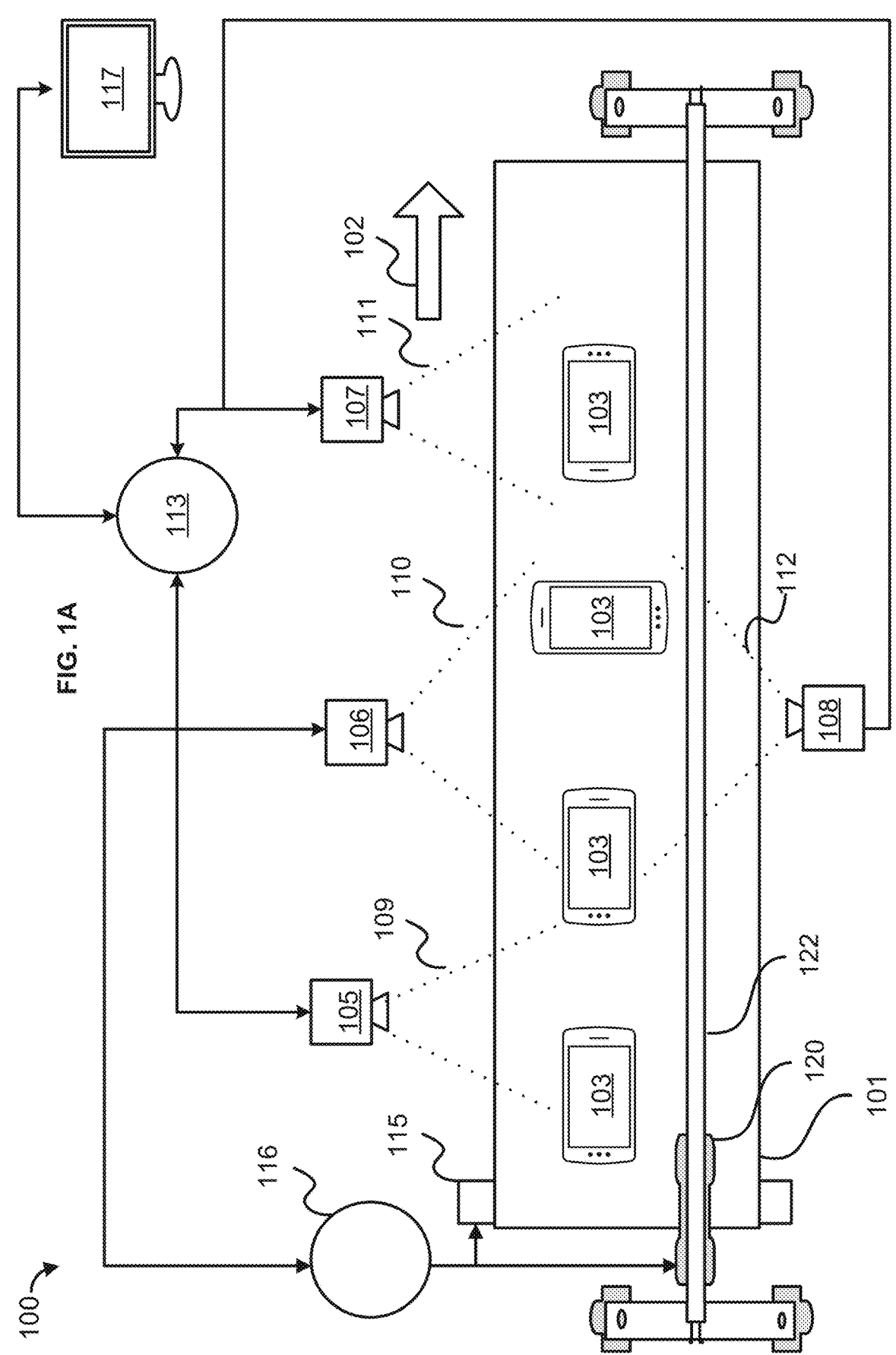
FIGS. 1A-1C show an example system for grading user devices.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, may be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions. The present disclosure relates to improvements in computer functionality and device grading.

A modular system/device may include a plurality of imaging devices (e.g., line scan cameras, area scan cameras, computer/machine vision cameras, etc.) positioned at different locations relative to redundant conveyors to enable high-velocity inspection and grading/scoring (e.g., cosmetic/aesthetic grading, predicted functionality grading, etc.) for user devices (e.g., mobile devices, smartphones, IoT devices, electronic devices, etc.). The plurality of imaging devices may capture image data of each side/surface of a user device. The image data may be used to determine the user device type, as well as the type, location, quantity, and/or size of any defect (e.g., a crack, a dent, a misconfiguration, damage, etc.) to the user device. The modular system/device, based on the location, quantity, and/or size of any aesthetic defect, such as a crack and/or a dent to the exterior body of a user device, may predict and/or determine a functional defect of the user device, such as an inoperable transceiver, a non-functional display, and/or misoperating speaker/microphone.

A grade/score may be determined for any defect, area of the user device associated with a defect, and/or user device that includes/excludes defects. Grading/scoring specifications/parameters may be preset and/or customized, for example, via a user interface. The system/device may determine to skip one or more grading/scoring steps/operations if a certain type of defect is determined, such as a crack to a screen and/or frame/body of a mobile device.

FIG. 1A shows an example system 100 in which the present methods and systems may operate. One skilled in the art will appreciate that provided herein is a functional description and that the respective functions may be performed by software, hardware, or a combination of software and hardware.

The system 100 may comprise a conveyor belt 101. Although only the conveyor belt 101 is shown for simplicity, the system may include any number of conveyors (e.g., one or more conveyors), such as redundant conveyors, complementary conveyors, multi-level conveyors, and/or the like. The conveyor belt 101 is shown traveling in direction 102. The conveyor belt 101 may travel and/or accelerate in the direction 102 at any rate/speed, such as 163 millimeters per second and/or the like.

One or more objects, such as one or more user devices (e.g., mobile devices, smartphones, IoT devices, electronic devices, etc.) may be placed on the conveyor belt 101. For example, one or more mobile devices 103 may be placed on the conveyor belt 101 manually and/or via a robotic arm 120 attached to a gantry 122. The robotic arm 120 may be, for example, a multi-axis (e.g., 4-axis, 6-axis, etc.) robotic arm/system and/or the like. The gantry 122 enables the robotic arm 120 to be moved to any position/location along the conveyor belt 101. The robotic arm 120 and the gantry 122 may be connected to and/or in communication with a programmable logic controller (PLC) 116 (the PLC 116 may comprise a computing device, a PLC, or any other controller/processor, etc.). The PLC 116 may be configured to control precise movements of the robotic arm 120, for example, according to an axis of the multi-axis robotic arm 120. The PLC 116 may be configured to control precise movements of the robotic arm 120, for example, in any direction (e.g., up, down, left, right, an angled direction, etc.), relative to the gantry 122 and/or the conveyor belt 101.

The PLC 116 may send one or more signals that cause the robotic arm 120 to move in any direction and/or manipulate the position of a mobile device 103 along the conveyor belt 101. For example, the PLC 116 may cause the robotic arm 120 to pick up, place, rotate, turn over, reposition, and/or the like a mobile device 103 along the conveyor belt 101. The robotic arm 120 may include one or more grippers, vacuum/suction components, controllable fingers, and/or the like that enable the robotic arm 120 to pick up, place, rotate, turn over, reposition, and/or the like a mobile device 103 along the conveyor belt 101.

The conveyor belt 101 may pass over a drive roll which may be driven by a motor 115 (e.g., an AC motor, a DC motor, a servo motor, a stepper motor, a belt drive motor, a pulse operated motor, etc.). The use of the motor 115 enables precise positioning of the one or more mobile devices 103 relative to a camera 105, a camera 106, a camera 107, and a camera 108. The conveyor belt 101 may be precisely advanced (or reversed) to cause each of the one or more mobile devices 103 to be moved into a field of view 109, a field of view 110, a field of view 111, and a field of view 112 associated with the camera 105, the camera 106, the camera 107, and the camera 108, respectively. The PLC 116 may be configured to cause the motor 115 to execute any number of motions/steps in either direction to cause the one or more mobile devices 103 to be moved into the field of view 109, the field of view 110, the field of view 111, and the field of view 112.

Figure 1B:

The cameras 105-108 may be oriented at different positions/locations relative to the conveyor belt 101. For example, the camera 105 may be positioned/located above the conveyor belt 101. The camera 105 may be positioned/located above the conveyor belt 101 so that the camera 105, via the field of view 109, captures and/or determines image data from above (e.g., a topside, etc.) a mobile device 103. The camera 107 may be positioned/located below, under, and/or at an angle lower than the conveyor belt 101. The camera 107 may be positioned/located below, under, and/or at an angle lower than the conveyor belt 101 so that the camera 107, via the field of view 111, captures and/or determines image data from under (e.g., a bottom-side, etc.) a mobile device 103. FIG. 1B shows example orientation and/or positioning of the cameras 105 and 107. FIG. 1B includes a side view representation of the conveyor belt 101.

Figure 1C:
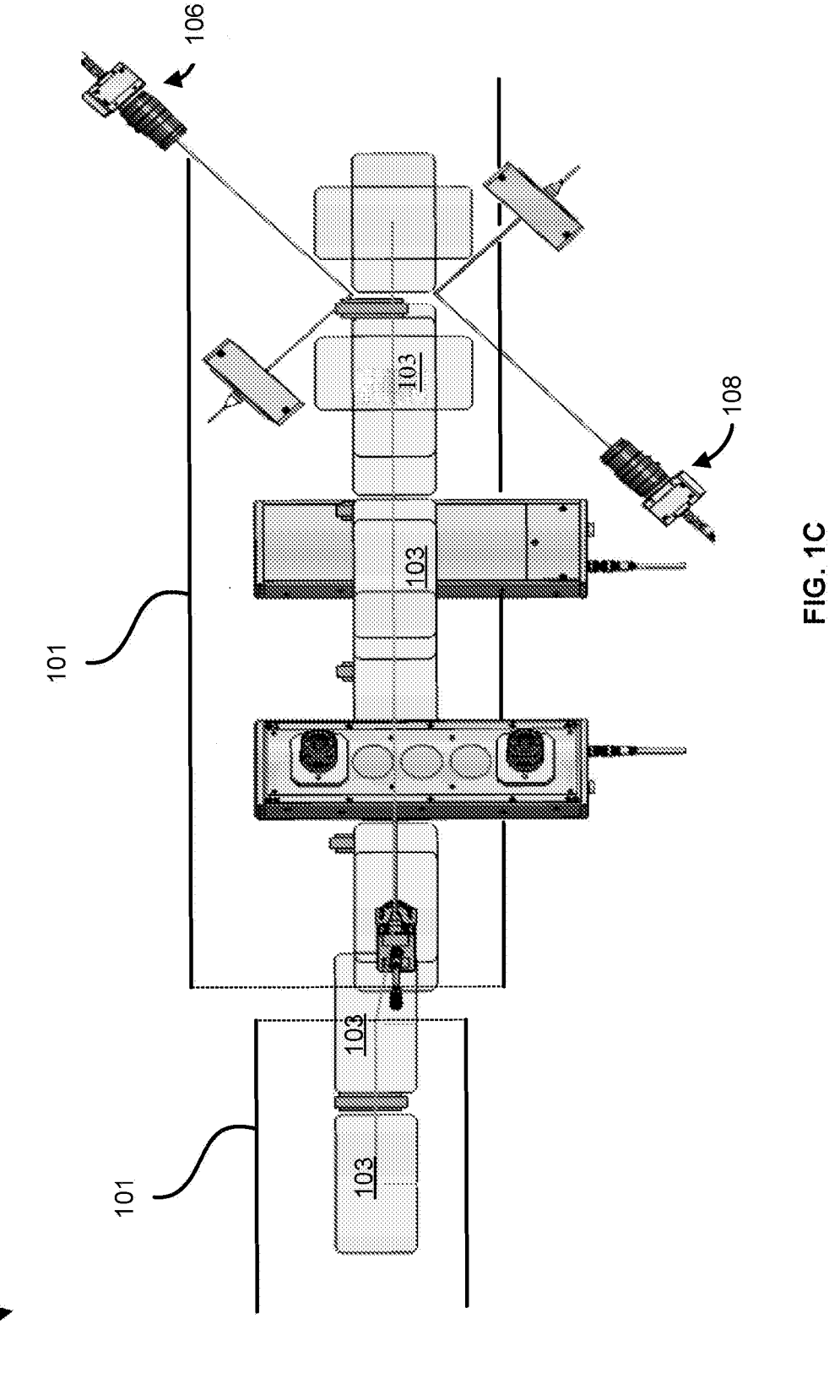

Returning to FIG. 1A, the camera 106 may be positioned/located on a side (e.g., left side, etc.) of the conveyor belt 101. The camera 106 may be positioned/located on the side of the conveyor belt 101 so that the camera 106, via the field of view 110, captures and/or determines image data from a side (e.g., a side view, etc.) of a mobile device 103. The camera 108 may be positioned/located on a side (e.g., right side, etc.) of the conveyor belt 101. The camera 108 may be positioned/located on the side of the conveyor belt 101 so that the camera 108, via the field of view 112, captures and/or determines image data from a side (e.g., a side view, etc.) of a mobile device 103. The camera 108, may capture and/or determine image data from a side (e.g., a side view, etc.) of a mobile device 103 that is opposite from the side from which the camera 106 captures and/or determines image data. FIG. 1C shows example orientation and/or positioning of the cameras 106 and 108. FIG. 1C includes a top view representation of the conveyor belt 101.

Returning to FIG. 1A, the cameras 105-108 may be and/or include line scan cameras, area scan cameras, 3D imaging cameras, inspection cameras, laser cameras, object detection cameras, and/or any other camera/imaging device. The cameras 105-108 may be configured for scanning, decoding, reading, sensing, imaging, capturing, and/or interpreting visual codes, for example, to determine a type of mobile device 103. The cameras 105-108 may include an imaging component for scanning, reading, and decoding one-dimensional or two-dimensional barcodes, quick response (QR) codes, manufacturer labels, trademarks, insignia, and/or the like that indicate a type of mobile device 103. The cameras 105-108 may include one or more depth cameras for capturing, processing, sensing, observing, modeling, detecting, and interacting with three-dimensional environments. The cameras 105-108 may recognize and detect depths and colors of objects in the field of views 109-112. The cameras 105-108 may also provide other camera and video recorder functionalities, such as taking pictures, recording videos, streaming images or other data, storing data in image buffers, etc. The cameras 105-108 may determine sizes, orientations, and/or visual properties of the one or more mobile devices 103, such as one or more defects of and/or associated with a mobile device 103.

The cameras 105-108 may include appropriate hardware and software components (e.g., circuitry, software instructions, etc.) for transmitting/sending signals and data/information, such as imaging data, to and from a pass/fail controller 113 to conduct processes/methods as disclosed herein. The pass/fail controller may 113 comprise a computing device, a PLC, or other controllers/processors. The cameras 105-108 may each send/transmit image data associated with a mobile device 103 to the pass/fail controller 113. The pass/fail controller 113 may use image data to inspect a mobile device 103 for one or more defects and determine if the mobile device 103 passes or fails the inspection.

Figure 2:
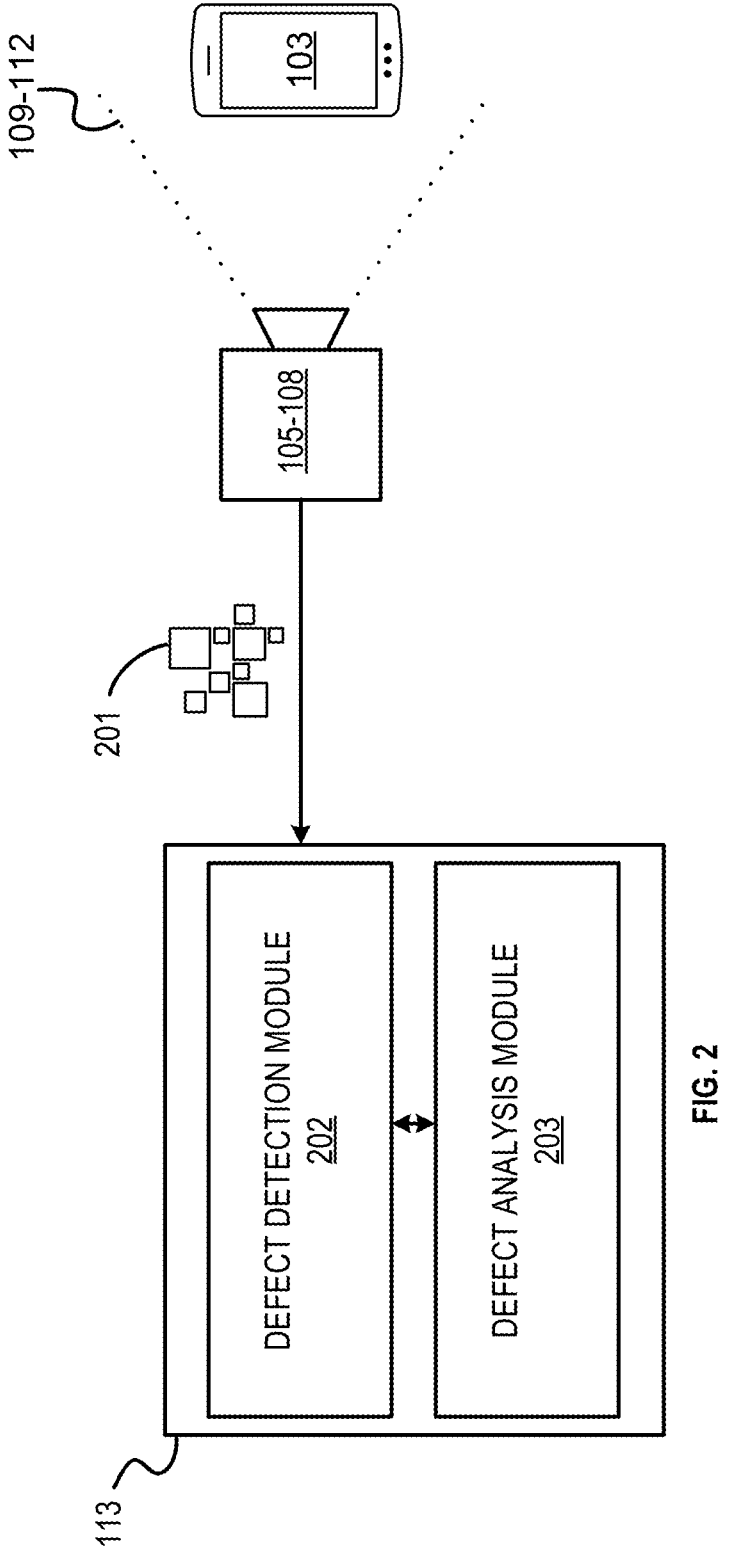
FIG. 2 shows an example system for grading user devices.

FIG. 2 shows an example block diagram of the cameras 105-108 sending/transmitting image data 201 associated with a mobile device 103 to the pass/fail controller 113. The pass/fail controller 113 may include a defect detection module 202 and a defect analysis module 203. The defect detection module 202 and the defect analysis module 203 may be configured to analyze image data received from the cameras 105-108, determine one or more defects associated with a mobile device 103 and determine/assign a grade/score to the mobile device 103 and/or a portion of the mobile device 103 based on defects (and/or a lack of defects) associated with a mobile device 103 (or any other user device). The defect detection module 202 may be configured to perform machine/computer vision operation, object recognition, image analysis, and/or the like. For example, the defect detection module 202 may be a trained machine learning model.

The defect detection module 202 and/or the defect analysis module 203 may use the image data 201 to determine a device type, as well as the type, location, quantity, and/or size of any defect (e.g., a crack, a dent, a misconfiguration, damage, etc.) to a mobile device 103. The defect detection module 202 and/or the defect analysis module 203 may use the image data to determine/identify aesthetic defects of a mobile device 103 and predict/determine an associated/resulting functional defect of the mobile device 103. For example, the defect detection module 202 and/or the defect analysis module 203, based on the location, quantity, and/or size of any aesthetic defect, such as a crack and/or a dent to the exterior body of a mobile device 103, may predict and/or determine a functional defect of the mobile device 103, such as an inoperable transceiver, a non-functional display, and/or misoperating speaker/microphone.

The pass/fail controller 113 (e.g., the defect detection module 202 and/or the defect analysis module 203, etc.) may determine a grade/score for any defect (e.g., an aesthetic defect, a functional defect, etc.), determine an area of a mobile device 103 associated with a defect, and/or determine whether the mobile device 103 includes/excludes defects. Grading/scoring specifications/parameters may be preset and/or customized, for example, via a user interface (e.g., a display 117, etc.).

Figure 3:
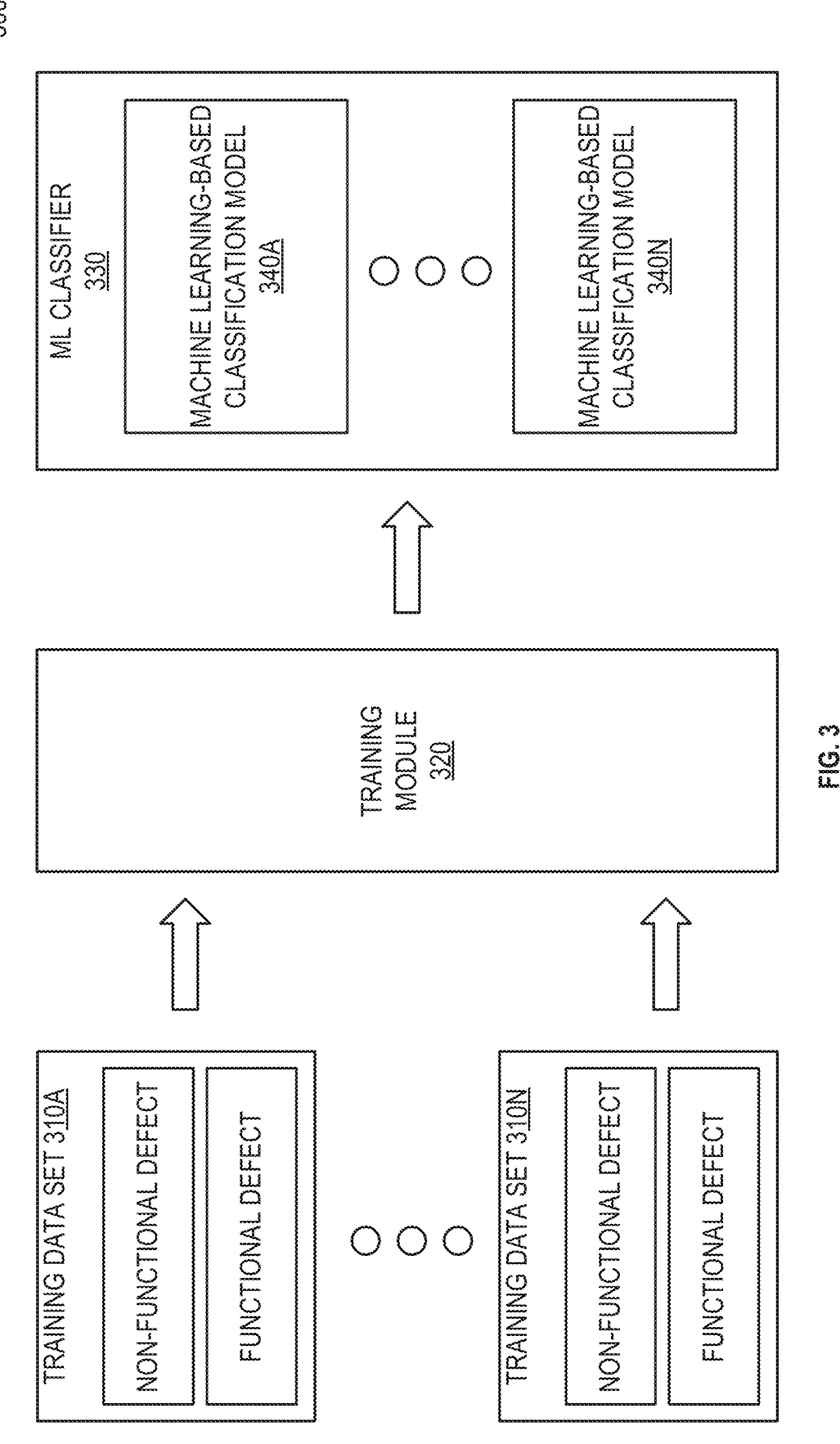
FIG. 3 shows an example system.

FIG. 3 shows a block diagram of system 300 for training/operating the defect detection module 202. The defect detection module 202 learns from image data of both good and bad parts, components, aspects, and/or functions of a user device, such as a mobile device to reduce and/or eliminate the time required to specify defects and respond to changing requirements. The system 300 may use machine learning techniques to train, based on an analysis of one or more training datasets 310A-310N by a training module 320, at least one machine learning-based classifier 330 that is configured to classify features extracted from reference/test image and/or image data associated with user devices (e.g., mobile devices, smartphones, IoT devices, electronic devices, a mobile device 103, etc.). The features may indicate non-functional defects, such as scratches and/or dents to a mobile device 103, and potential functional defects, such as malfunctioning transceivers, antennas, speakers/microphones, and/or the like.

For example, the features may indicate aspects of the user device, such as a defect-free surface and/or design type, one or more aesthetic defects (e.g., dents, scratches, etc.), a defective surface and/or design type, and/or the like. The machine learning-based classifier 330 may classify features extracted from image data to determine/predict defects (e.g., aesthetic defects, functional defects, etc.) associated with a user device, such as a mobile device. For example, the system 300 may be trained to determine/predict that an aesthetic defect to a mobile device 103, such as a dent to the body/frame of the mobile device 103 in a specific area, causes a functional defect to the mobile device 103, such as an inoperable and/or misfunctioning transceiver, antenna, display, microphone, speaker, and/or the like of the mobile device 103. The system 300 may be used to predict and/or determine any defect associated with a user device, such as a mobile device.

The one or more training datasets 310A-310N may comprise labeled baseline data such as labeled defects, labeled non-defects, labeled ideal conditions, and/or the like. The labeled datasets may include features extracted from image data associated with mobile devices and/or any other user device. Labeled baseline data may indicate correspondences and/or associations between types of aesthetic defects of a user/mobile device and functional defects of the user/mobile device. The labeled baseline data may include any number of feature sets (labeled data that identify extracted features for a specific type of defect, etc.). Extracting features from image data may include matching a feature template to an image and identifying features in the image that match the feature-template.

The labeled baseline data may be stored in one or more databases. Data determined/extracted from image data may be randomly assigned to a training dataset or a testing dataset. The assignment of data to a training dataset or a testing dataset may not be completely random. In this case, one or more criteria may be used during the assignment, such as ensuring that similar device defects, dissimilar device defects, and/or the like may be used in each of the training and testing datasets. In general, any suitable method may be used to assign the data to the training or testing datasets.

The training module 320 may train the machine learning-based classifier 330 by extracting a feature set from the labeled baseline data according to one or more feature selection techniques. In some instances, the training module 320 may further define the feature set obtained from the labeled baseline data by applying one or more feature selection techniques to the labeled baseline data in the one or more training datasets 310A-310N. The training module 320 may extract a feature set from the training datasets 310A-310N in a variety of ways. The training module 320 may perform feature extraction multiple times, each time using a different feature-extraction technique. In some instances, the feature sets generated using the different techniques may each be used to generate different machine learning-based classification models 340. In an embodiment, the feature set with the highest quality metrics may be selected for use in training. The training module 320 may use the feature set(s) to build one or more machine learning-based classification models 340A-340N that are configured to determine/identify a defect (e.g., an aesthetic defect, etc.) to a user device, such as a mobile device, and/or predict/determine a potential defect (e.g., a functional defect, etc.) to a user device, such as a mobile device.

The training datasets 310A-310N and/or the labeled baseline data may be analyzed to determine any dependencies, associations, and/or correlations between data/information in the training datasets 310A-310N and/or the labeled baseline data. The term "feature," as used herein, may refer to any characteristic of an item of data that may be used to determine whether the item of data falls within one or more specific categories. By way of example, the features described herein may comprise features associated with both good and bad parts, components, aspects, and/or functions of a user device, such as a mobile device.

A feature selection technique may comprise one or more feature selection rules. The one or more feature selection rules may comprise determining which features in the labeled baseline data appear over a threshold number of times in the labeled baseline data and identifying those features that satisfy the threshold as candidate features. For example, any feature that appears greater than or equal to 2 times in the labeled baseline data may be considered as candidate features. Any features appearing less than 2 times may be excluded from consideration as a feature. A single feature selection rule may be applied to select features or multiple feature selection rules may be applied to select features. The feature selection rules may be applied in a cascading fashion, with the feature selection rules being applied in a specific order and applied to the results of the previous rule. For example, the feature selection rule may be applied to the labeled baseline data to determine, identify, and/or predict defects of a user device, such as a mobile device. A final list of candidate features may be analyzed according to additional features.

Defect detection and analysis may be based on a wrapper method. A wrapper method may be configured to use a subset of features and train the machine learning model using the subset of features. Based on the inferences that are drawn from a previous model, features may be added and/or deleted from the subset. Wrapper methods include, for example, forward feature selection, backward feature elimination, recursive feature elimination, combinations thereof, and/or the like. In some instances, forward feature selection may be used to identify one or more candidate defects of a user device, such as a mobile device, for example, a crack to a frame, a dented body, a misconfigured component, and/or the like. Forward feature selection is an iterative method that begins with no feature in the machine learning model. In each iteration, the feature which best improves the model is added until the addition of a new variable does not improve the performance of the machine learning model. In an embodiment, backward elimination may be used to identify one or more candidate defects of a user device (e.g., a mobile device, etc.), for example, a crack to a frame, a dented body, a misconfigured component, and/or the like. Backward elimination is an iterative method that begins with all features in the machine learning model. In each iteration, the least significant feature is removed until no improvement is observed on the removal of features.

Recursive feature elimination may be used to identify one or more candidate defects of a user device (e.g., a mobile device, etc.), for example, a crack to a frame, a dented body, a misconfigured component, and/or the like. Recursive feature elimination is a greedy optimization algorithm which aims to find the best performing feature subset. Recursive feature elimination repeatedly creates models and keeps aside the best or the worst performing feature at each iteration. Recursive feature elimination constructs the next model with the features remaining until all the features are exhausted. Recursive feature elimination then ranks the features based on the order of their elimination.

One or more candidate defects (e.g., aesthetic defects, functional defects, etc.) of a user device (e.g., a mobile device, etc.), for example, a crack to a frame, a dented body, a misconfigured component, an inoperable/malfunctioning component (e.g., a functional defect, etc.), and/or the like may be determined according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to the absolute value of the magnitude of coefficients and ridge regression performs L2 regularization which adds a penalty equivalent to the square of the magnitude of coefficients.

After the training module 320 has generated a feature set(s), the training module 320 may generate a machine learning-based predictive model 340 based on the feature set(s). A machine learning-based predictive model may refer to a complex mathematical model for data classification that is generated using machine-learning techniques. In one example, this machine learning-based classifier may include a map of support vectors that represent boundary features. By way of example, boundary features may be selected from, and/or represent the highest-ranked features in, a feature set.

In an embodiment, the training module 320 may use the feature sets extracted from the training datasets 310A-310N and/or the labeled baseline data to build a machine learning-based classification model 310A-310N to predict defects (e.g., aesthetic defects, functional defects, etc.) of a user device (e.g., a mobile device, etc.), for example, a crack to a frame, a dented body, a misconfigured component, an inoperable/malfunctioning component (e.g., a functional defect, etc.), and/or the like. In some examples, the machine learning-based classification models 340A-340N may be combined into a single machine learning-based classification model 340. Similarly, the machine learning-based classifier 330 may represent a single classifier containing a single or a plurality of machine learning-based classification models 340 and/or multiple classifiers containing a single or a plurality of machine learning-based classification models 340. The machine learning-based classifier 330 may also include each of the training datasets 310A-310N and/or each feature set extracted from the training datasets 310A-310N and/or extracted from the labeled baseline data.

The extracted features from image data may be combined in a classification model trained using a machine learning approach such as discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting machine learning-based classifier 330 may comprise a decision rule or a mapping that uses defect information (e.g., aesthetic defect information, functional defect information, etc.) to determine/predict defects of a user device (e.g., a mobile device, etc.), for example, a crack to a frame, a dented body, a misconfigured component, an inoperable/malfunctioning component (e.g., a functional defect, etc.), and/or the like.

The defect information and the machine learning-based classifier 330 may be used to predict defects for the test samples in the test dataset. In one example, the result for each test sample includes a confidence level that corresponds to a likelihood or a probability that the corresponding test sample accurately predicts a defect (and/or the like). The confidence level may be a value between zero and one that represents a likelihood that the predicted defect (and/or the like) is consistent with a computed value. Multiple confidence levels may be provided for each test sample and each candidate defect (and/or the like). A top-performing candidate defect (and/or the like) may be determined by comparing the result obtained for each test sample with a computed defect (and/or the like) for each test sample. In general, the top-performing candidate defects (and/or the like) will have results that closely match the computed defect (and/or the like). The top-performing candidate defect (and/or the like) may be used for defect analysis, for example, determining/predicting defects of a user device (e.g., a mobile device, etc.), for example, a crack to a frame, a dented body, a misconfigured component, an inoperable/malfunctioning component (e.g., a functional defect, etc.), and/or the like.

Figure 4:
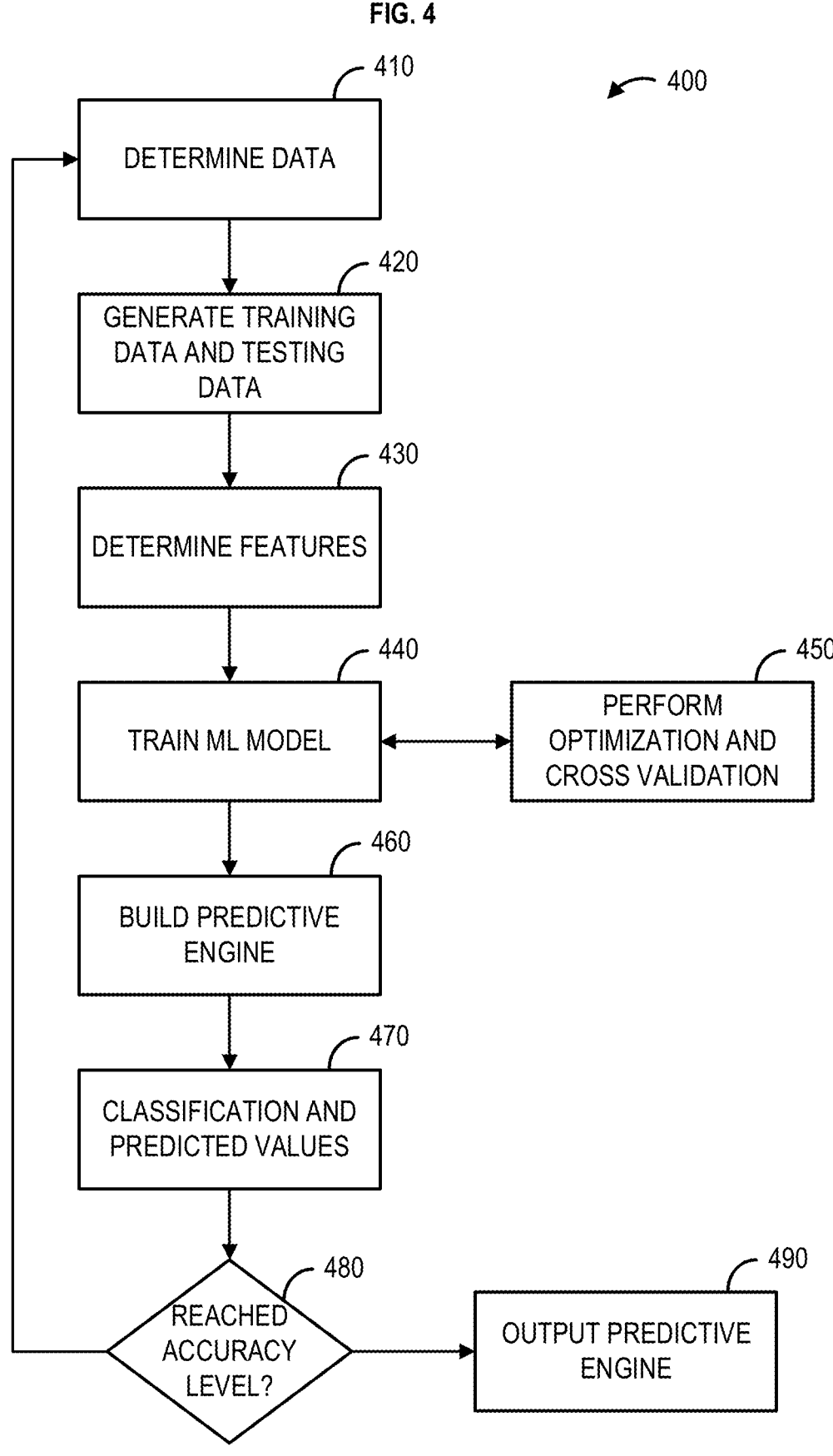
FIG. 4 shows an example system.

FIG. 3 is a flowchart illustrating an example training method 300 for generating the machine learning classifier 330 using the training module 320. The training module 320 can implement supervised, unsupervised, and/or semi-supervised (e.g., reinforcement-based) machine learning-based classification models 340. Method 400, shown in FIG. 4, is an example of a supervised learning method; variations of this example of training method are discussed below, however, other training methods can be analogously implemented to train unsupervised and/or semi-supervised machine learning (predictive) models.

The training method 400 may determine information for determining defects of a user device (e.g., a mobile device, etc.), for example, a crack to a frame, a dented body, a misconfigured component, and/or the like at 410. The information for determining defects may contain one or more datasets. Each dataset may include labeled baseline data.

The training method 400 may generate, at 420, a training dataset and a testing dataset. The training dataset and the testing dataset may be generated by calculating and/or computing defects of a user device (e.g., a mobile device, etc.), for example, a crack to a frame, a dented body, a misconfigured component, and/or the like based on historical predictions of defects. The training dataset and the testing dataset may be generated by randomly assigning defect data to either the training dataset or the testing dataset. In some instances, the assignment of defect data as training or test samples may not be completely random. In some instances, only the labeled baseline data for a specific feature extracted from defect data may be used to generate the training dataset and the testing dataset. In some instances, a majority of the labeled baseline data extracted from defect data may be used to generate the training dataset. For example, 75% of the labeled baseline data for predicting defects of a user device (e.g., a mobile device, etc.), a crack to a frame, a dented body, a misconfigured component, and/or the like extracted from image data and/or defect data may be used to generate the training dataset and 25% may be used to generate the testing dataset. Any method or technique may be used to create the training and testing datasets.

The training method 400 may determine (e.g., extract, select, etc.), at 430, one or more features that can be used by, for example, a classifier to label features extracted from image data and/or defect data. The one or more features may include and/or indicate defects of a user device (e.g., a mobile device, etc.), for example, a crack to a frame, a dented body, a misconfigured component, and/or the like. The training method 400 may determine a set of training baseline features from the training dataset. Features of image data and/or defect data may be determined by any method.

The training method 400 may train one or more machine learning models using the one or more features at 440. In some instances, the machine learning models may be trained using supervised learning. In another embodiment, other machine learning techniques may be employed, including unsupervised learning and semi-supervised. The machine learning models trained at 440 may be selected based on different criteria (e.g., how close a predicted defect and/or the like is to an actual defect of a user/mobile device, etc.) and/or data available in the training dataset. For example, machine learning classifiers can suffer from different degrees of bias. Accordingly, more than one machine learning model can be trained at 440, optimized, improved, and cross-validated at 450.

The training method 400 may select one or more machine learning models to build a predictive model at 460 (e.g., a machine learning classifier, a predictive model, the defect detection module 202, etc.). The predictive engine may be evaluated using the testing dataset. The predictive engine may analyze the testing dataset and generate classification values and/or predicted values at 470. Classification and/or prediction values may be evaluated at 480 to determine whether such values have achieved a desired accuracy level. Performance of the predictive engine may be evaluated in a number of ways based on a number of true positives, false positives, true negatives, and/or false negative classifications of the plurality of data points indicated by the predictive engine. For example, the false positives of the predictive engine may refer to a number of times the predictive engine incorrectly predicted a defect and/or the like. Conversely, the false negatives of the predictive engine may refer to a number of times the machine learning model predicted a defect and/or the like incorrectly, when in fact, the predicted defect and/or the like matches an actual defect and/or the like of a user device (e.g., a mobile device, etc.), for example, a crack to a frame, a dented body, a misconfigured component, and/or the like. True negatives and true positives may refer to a number of times the predictive engine correctly predicted a defect and/or the like. Related to these measurements are the concepts of recall and precision. Generally, recall refers to a ratio of true positives to a sum of true positives and false negatives, which quantifies a sensitivity of the predictive engine. Similarly, precision refers to a ratio of true positives to a sum of true and false positives.

When such a desired accuracy level is reached, the training phase ends and the predictive engine may be output at 490; when the desired accuracy level is not reached, however, then a subsequent iteration of the training method 400 may be performed starting at 410 with variations such as, for example, considering a larger collection of image data and/or defect data.

Returning to FIG. 2, an output of the defect detection module 202 may be passed to the defect analysis module 203. The output of the defect detection module 202 may include results of defect detection, such as defect locations, sizes, types, quantities, and/or the like, may be provided to the defect analysis module 202. The defect analysis module 203 may determine/generate images and/or results, such as a map of defects that indicates a location, size, type, quantity, and/or the like. The defect analysis module 203 may determine/generate a grade/score for any defect, area of the user/mobile device associated with a defect, and/or user/mobile device that includes/excludes defects. Grading/scoring specifications/parameters may be preset and/or customized, for example, via a user interface (e.g., a display 117, etc.).

The defect analysis module 203 may determine that a mobile device (e.g., a mobile device 103, etc.) and/or smartphone should be associated with an overall rank based on values between any range, such as 0 and 55,780. The overall ranking may be indicative of defects associated with the mobile device and/or smartphone categorized by area, count, and/or region of defect. The system 100 may determine to skip one or more grading/scoring steps/operations if a certain type of defect is determined and/or predicted, such as a crack to a screen, a malfunctioning component, and/or dented frame/body of a mobile device 103, and the mobile device 103 may be discarded, classified (e.g., classified as defective, etc.), sent for manual inspection, and/or the like.

Returning to FIG. 1A, the pass/fail controller 113 may determine, grade, and/or score defects affecting a mobile device 103. For example, the pass/fail controller 113 may determine an overall ranking for a mobile device 103. A mobile device 103 may be ranked, for example, between any range, such as 0 and 55,780, based upon defects in and/or to the mobile device 103 categorized by area, count, and/or region of defect. Different areas/portions of a mobile device 103 may be ranked/scored based on various ranges of values that, together, total an overall ranking for the mobile device. For example, a ranking value for a display, a back housing, a bottom edge, a top edge, a left edge, and a right edge of a mobile device 103 may be determined.

Table 1 shows an example overall ranking for a mobile device 103. Table 1 indicates different regions of a mobile device 103 (e.g., a display, a back housing, a bottom edge, a top edge, a left edge, a right edge, etc.) and the associated ranking value ranges for the specific region based on where defects are determined and/or identified. The software allows for table 1 and the following tables 2-22 to be easily customizable. These ranges and values can be modified to accommodate new features added to a mobile device 103 as well as different weighting with regards to varying defect characteristics.

TABLE 1

| Region | Rank |
|---|---|
| Display | 0-34,385 |
| Back Housing | 0-21,040 |
| Bottom Edge | 0-100 |
| Top Edge | 0-75 |
| Left Edge | 0-95 |
| Right Edge | 0-85 |
| Grand Total | 0-55,780 |

Table 2 shows a breakdown of the example ranking for a display (e.g., 0-34,385 as indicated by Table 1, etc.) of a mobile device 103 based on a front side analysis of image data (e.g., image data captured/determined by the camera 105, etc.) of a mobile device 103. As shown in Table 2, the letter "R" is used to denote that the associated ranking value is for a "region" of the display of a mobile device 103.

TABLE 2

| Region | Rank |
|---|---|
| R1-R9 Front Side | 0-28,125 |
| R10 - Top Notch | 0-3,125 |
| R11 - Front Camera | 0-5 |
| R12 - Receiver | 0-5 |
| R13 - Home Button | 0-3,125 |
| Grand Total Front Side | 0-34,385 |

Figure 5:
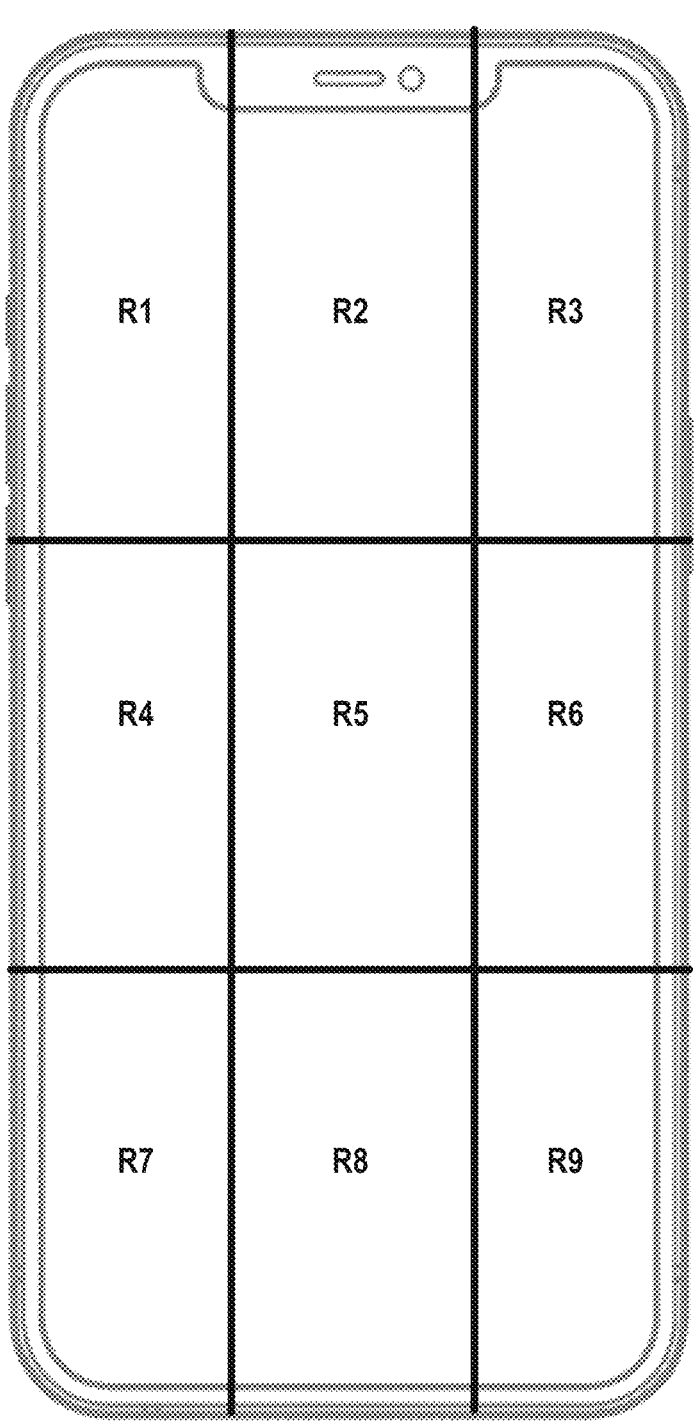

FIG. 5 shows an example front-side analysis of a display of a mobile device 103. The system 100 (FIG. 1A) may capture a front side image of the mobile device 103, for example via the camera 105, as the mobile device traverses the conveyor belt 101. The camera 105 (and associated lighting to illuminate the surface of the mobile device 103, etc.) may be triggered and/or caused to capture image data when the mobile device 103 reaches a sensor and/or the like along the path of the conveyor belt 101. The front side image of the mobile device 103, for example, an image of a front side display may be partitioned and/or divided into 9 regions R1-R9, where the letter "R" is used to reference the "region" of the display. Each region (R1-R9) may be analyzed separately by the pass/fail controller 113 to determine the number of defects, such as the top 10 defects, per region of the display. The system 100 may capture (via image data) and/or determine the area of the region where each of the top 10 defects is found/located. Each region (R1-R9) may be ranked and/or graded based on the area of the defects and the number of defects. The ranking and/or grading for R1-R9 may be where a value of 0 is the best ranking and/or grading and a value of 3125 represents the worst ranking and/or grading for the region/area. A perfect mobile device 103 may receive a value of 0 and the worst value a mobile device 103 may receive is 28,125 for R1-R9 combined. Table 3 provides a breakdown of how regions for the display of a mobile device 103 are graded, ranked, and/or scored.

TABLE 3

| Region Grade | Total Qty. of Defects | Allowed Defect Qty. of Area >= 1000 | Allowed Defect Qty. of Area >= 3000 | Allowed Defect Qty. of Area >= 4000 | Allowed Defect Qty. of Area >= 5000 | Allowed Defect Qty. of Area >= 7000 |
|---|---|---|---|---|---|---|
| 0 | 0 | 0 | 0 | 0 | 0 | 0 |
| 5 | 5 | 1 | 0 | 0 | 0 | 0 |
| 25 | 7 | 2 | 1 | 0 | 0 | 0 |
| 125 | 9 | 2 | 1 | 1 | 0 | 0 |
| 625 | Unlimited | Unlimited | Unlimited | Unlimited | Unlimited | 0 |
| 3125 | Unlimited | Unlimited | Unlimited | Unlimited | Unlimited | Unlimited |

Figure 6:
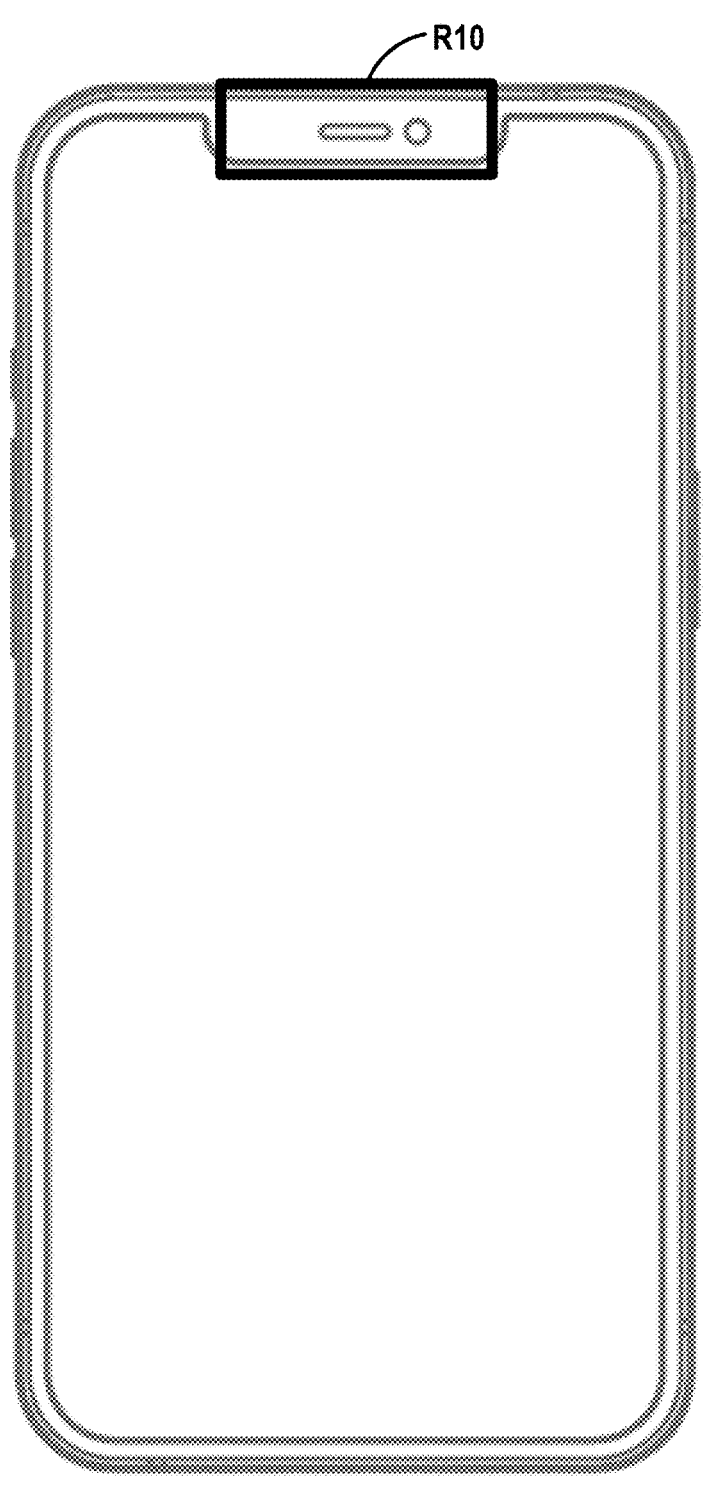

FIG. 6 shows an example front-side analysis of the bezel (R10) of a mobile device 103. The bezel area may cover a top notch portion of a mobile device 103. The system 100 (FIG. 1A) may capture a front camera image of the mobile device 103, for example via the camera 105, as the mobile device traverses the conveyor belt 101. The camera 105 (and associated lighting to illuminate the surface of the mobile device 103, etc.) may be triggered and/or caused to capture image data when the mobile device 103 reaches a sensor and/or the like along the path of the conveyor belt 101. Image data of the front display notch (e.g., top notch) may be analyzed to determine if the mobile device 103 has any scratches or cracks (excluding the receiver and the camera). The pass/fail controller 113 may analyze image data including the region/area R10 to determine the number of defects, such as the top 10 defects, per region of the display. R10 may have a rank, grade, and/or score, for example, from 0-3125, where a value of 0 is the best ranking and/or grading and a value of 3125 represents the worst ranking and/or grading for the region/area. Table 4 provides a breakdown of how the region/area R10 is graded, ranked, and/or scored.

TABLE 4

| Region Grade | Total Qty. of Defects | Allowed Defect Qty. of Area >= 1000 | Allowed Defect Qty. of Area >= 3000 | Allowed Defect Qty. of Area >= 4000 | Allowed Defect Qty. of Area >= 5000 | Allowed Defect Qty. of Area >= 7000 |
|---|---|---|---|---|---|---|
| 0 | 0 | 0 | 0 | 0 | 0 | 0 |
| 5 | 5 | 1 | 0 | 0 | 0 | 0 |
| 25 | 7 | 2 | 1 | 0 | 0 | 0 |
| 125 | 9 | 2 | 1 | 1 | 0 | 0 |
| 625 | Unlimited | Unlimited | Unlimited | Unlimited | Unlimited | 0 |
| 3125 | Unlimited | Unlimited | Unlimited | Unlimited | Unlimited | Unlimited |

Figure 7:
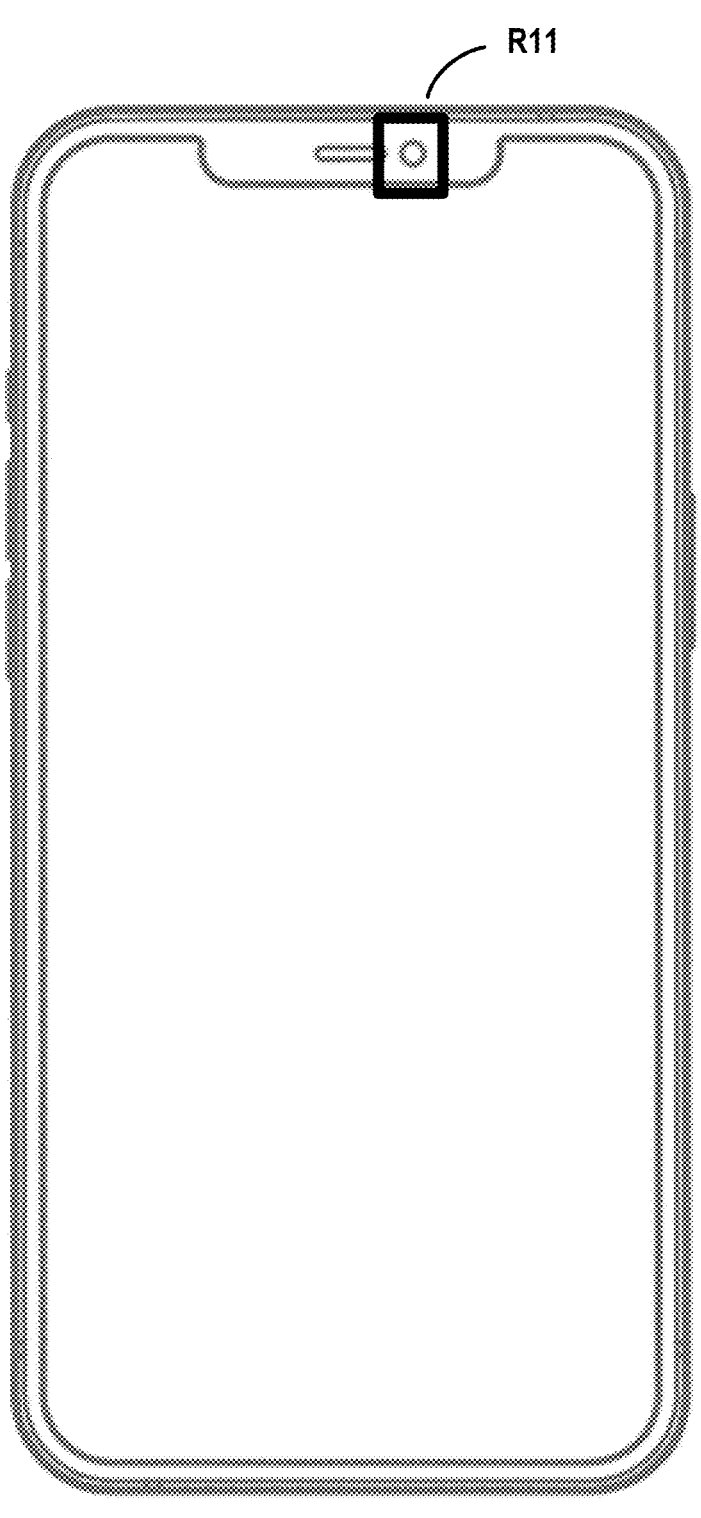

FIG. 7 shows an example front-side analysis of a front-side camera of a mobile device 103. The region/area comprising the front-side camera may be denoted R11. The system 100 (FIG. 1A) may capture a front camera image of the mobile device 103, for example via the camera 105, as the mobile device traverses the conveyor belt 101. The camera 105 (and associated lighting to illuminate the surface of the mobile device 103, etc.) may be triggered and/or caused to capture image data when the mobile device 103 reaches a sensor and/or the like along the path of the conveyor belt 101. Image data of the front-side camera may be analyzed to determine if the mobile device 103 has any defect, damages, and/or the like. The pass/fail controller 113 may analyze image data including the region/area R11 to determine the presence of defects. R11 may have a rank, grade, and/or score, for example, from 0-5 where a value of 0 is the best ranking and/or grading and a value of 5 represents the worst ranking and/or grading for the region/area. Table 5 provides a breakdown of how the region/area R11 is graded, ranked, and/or scored based on a comparison evaluating a percent match to Golden, which refers to a registered image without defects.

TABLE 5

| Comparison | % Match | Rank |
|---|---|---|
| % Match to Golden | 90% | 0 |
| % Match to Golden | <90% | 5 |

Figure 8:
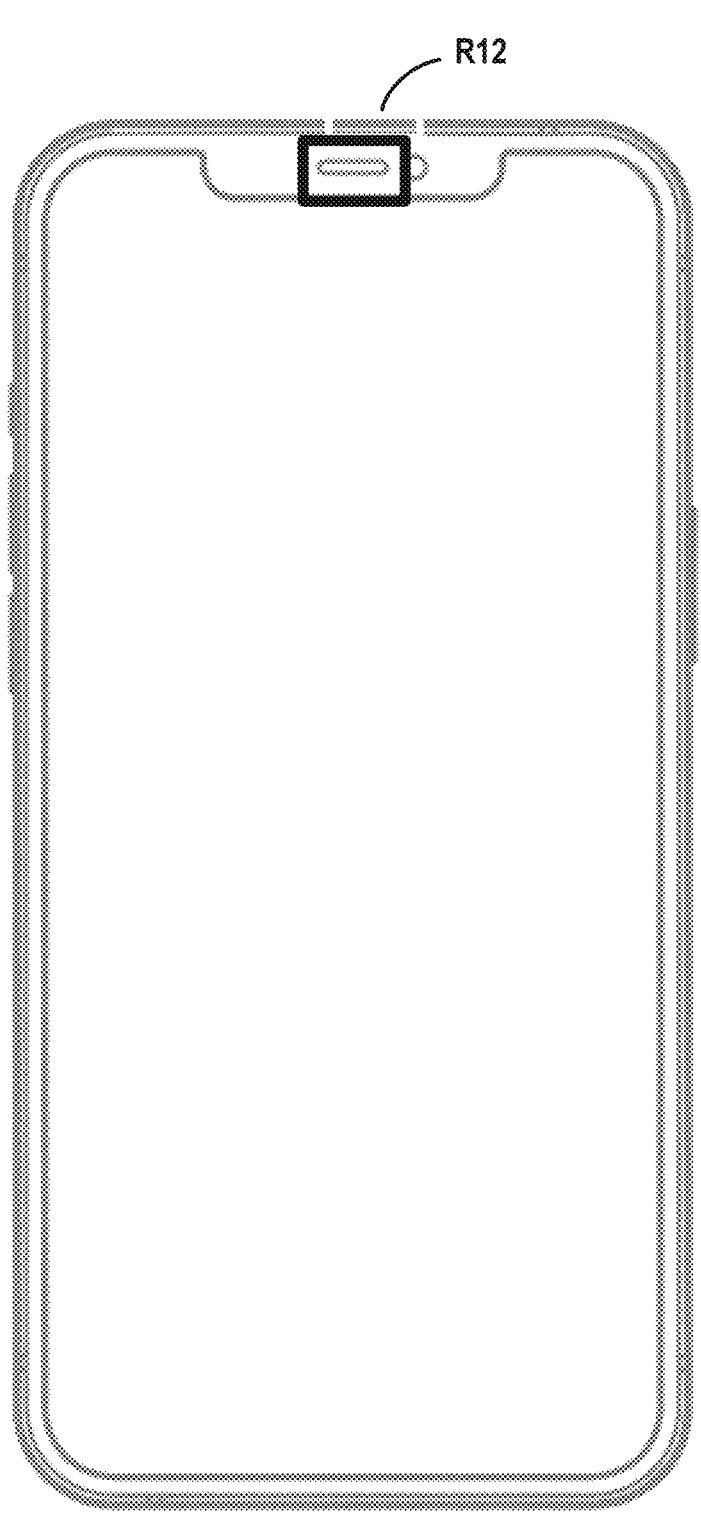

FIG. 8 shows an example front-side analysis of a receiver of a mobile device 103. The region/area comprising the receiver may be denoted R12. The system 100 (FIG. 1A) may capture a front camera image of the mobile device 103, for example via the camera 105, as the mobile device traverses the conveyor belt 101. The camera 105 (and associated lighting to illuminate the surface of the mobile device 103, etc.) may be triggered and/or caused to capture image data when the mobile device 103 reaches a sensor and/or the like along the path of the conveyor belt 101. Image data of the receiver may be analyzed to determine if the mobile device 103 has any defect, damages, and/or the like. The pass/fail controller 113 may analyze image data including the region/area R12 to determine the presence of defects. R12 may have a rank, grade, and/or score, for example, from 0-5 where a value of 0 is the best ranking and/or grading and a value of 5 represents the worst ranking and/or grading for the region/area. Table 6 provides a breakdown of how the region/area R12 is graded, ranked, and/or scored based on a comparison evaluating a percent match to Golden, which refers to a registered image without defects.

TABLE 6

| Comparison | % Match | Rank |
|---|---|---|
| % Match to Golden | 90% | 0 |
| % Match to Golden | <90% | 5 |

Table 7 shows a breakdown of the example ranking for a back housing (e.g., 0-21,040 as indicated by Table 1, etc.) of a mobile device 103 based on a backside analysis of image data (e.g., image data captured/determined by the camera 107, etc.) of a mobile device 103. As shown in Table 7, the letter "R" is used to denote that the associated ranking value is for a "region" of the housing of a mobile device 103.

TABLE 7

| Region | Rank |
|---|---|
| R1-R9 Enclosure | 0-13,500 |
| R10-R12 - Rear Camera | 0-4,500 |
| R13 - Flash | 0-1,500 |
| R14 - Rear Mic | 0-5 |
| R15 - Apple Logo | 0-25 |
| R16 - Apple artwork | 0-5 |
| R17 - Lidar | 0-5 |

Figure 9:
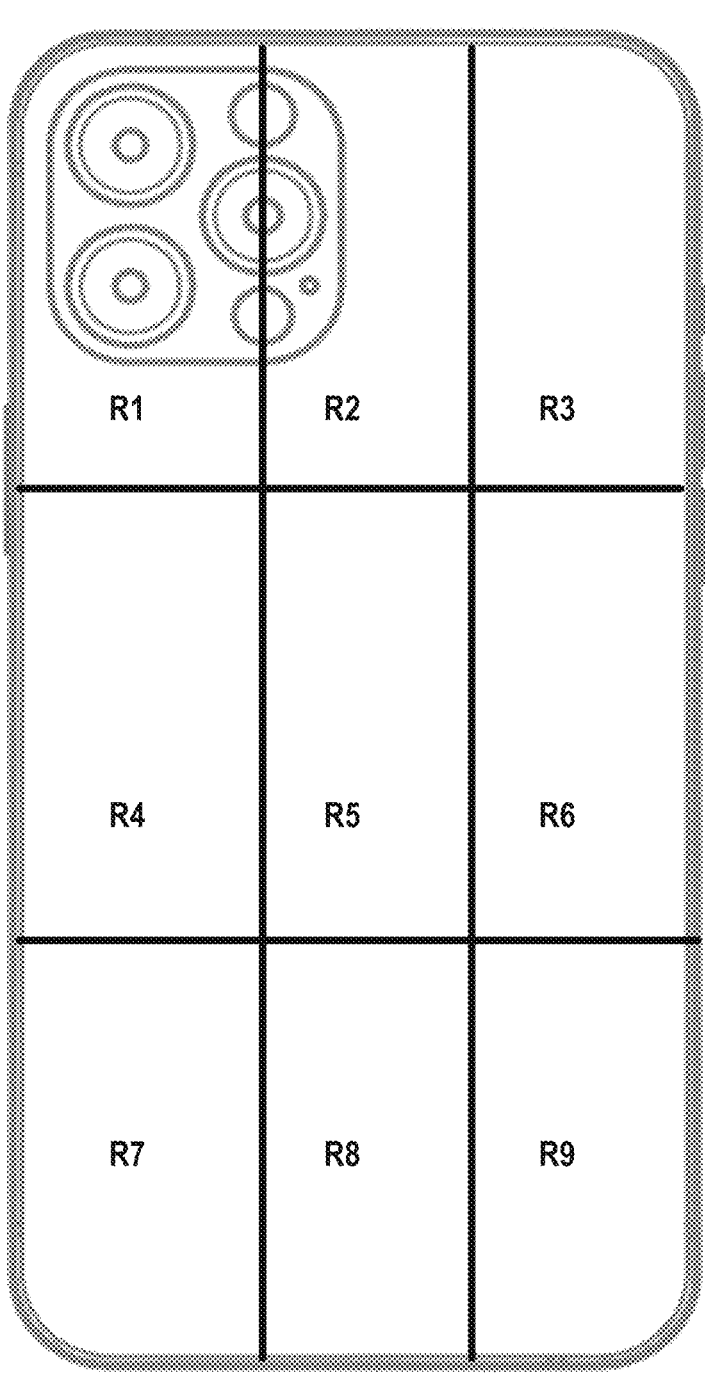

FIG. 9 shows an example backside analysis of a mobile device 103. The system 100 (FIG. 1A) may capture a backside image of the mobile device 103, for example via the camera 107, as the mobile device traverses the conveyor belt 101. The camera 107 (and associated lighting to illuminate the surface of the mobile device 103, etc.) may be triggered and/or caused to capture image data when the mobile device 103 reaches a sensor and/or the like along the path of the conveyor belt 101 and/or is manipulated by the robotic arm 120. The backside image of the mobile device 103, for example, may be partitioned and/or divided into 9 regions R1-R9, where the letter "R" is used to reference the region of the housing. Each region (R1-R9) may be analyzed separately by the pass/fail controller 113 to determine the number of defects, such as the top 10 defects, per region of the back housing. The system 100 may capture (via image data) and/or determine the area of the region where each of the top 10 defects is found/located. Each region (R1-R9) may be ranked and/or graded based on the area of the defects and the number of defects. The ranking and/or grading for R1-R9 may be where a value of 0 is the best ranking and/or grading and a value of 1500 represents the worst ranking and/or grading for the region/area. A perfect mobile device 103 may receive a value of 0 and the worst value a mobile device 103 may receive is 13,500 for R1-R9 combined. Table 8 provides a breakdown of how regions for the back housing of a mobile device 103 are graded, ranked, and/or scored.

TABLE 8

| Region Grade | Total Qty. of Defects | Allowed Defect Qty. of Area >= 1000 | Allowed Defect Qty. of Area >= 3000 | Allowed Defect Qty. of Area >= 4000 | Allowed Defect Qty. of Area >= 5000 | Allowed Defect Qty. of Area >= 7000 |
|---|---|---|---|---|---|---|
| 0 | 0 | 0 | 0 | 0 | 0 | 0 |
| 5 | 5 | 1 | 0 | 0 | 0 | 0 |
| 25 | 7 | 2 | 1 | 0 | 0 | 0 |
| 125 | Unlimited | Unlimited | Unlimited | Unlimited | Unlimited | 0 |
| 1500 | Unlimited | Unlimited | Unlimited | Unlimited | Unlimited | Unlimited |

Figure 10:
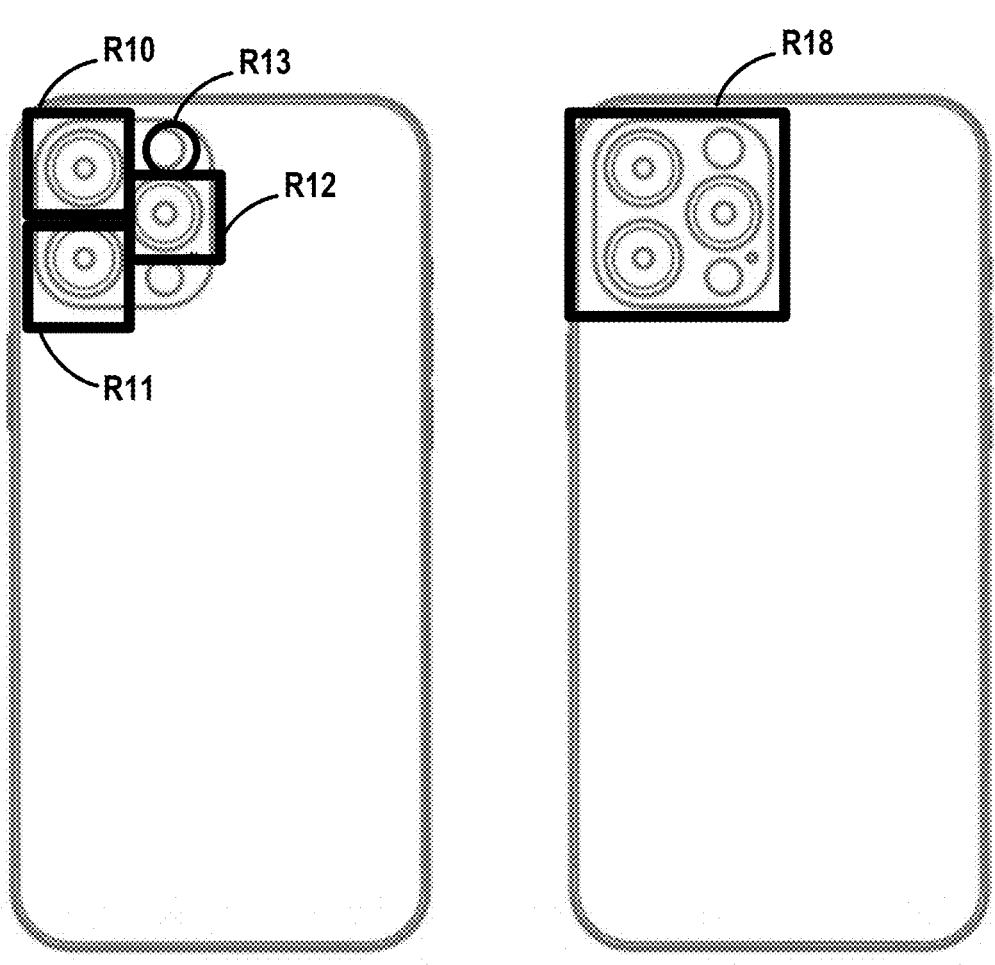

FIG. 10 shows an example backside analysis of a back housing camera region (R18), cameras (R10, R11, R12), and flash (R13) of a mobile device 103. The system 100 (FIG. 1A) may capture a backside image of the mobile device 103, for example via the camera 107, as the mobile device traverses the conveyor belt 101, for example, a second level of the conveyor belt 101, and/or is manipulated by the robotic arm 120. The camera 107 (and associated lighting to illuminate the surface of the mobile device 103, etc.) may be triggered and/or caused to capture image data when the mobile device 103 reaches a sensor and/or the like along the path of the conveyor belt 101. Image data of the back housing camera region (R18), cameras (R10, R11, R12), and flash (R13) may be analyzed to determine if the mobile device 103 has any scratches in the respective regions/areas. The pass/fail controller 113 may analyze image data including the back housing camera region (R18), cameras (R10, R11, R12), and flash (R13) to determine the presence of defects. R10 may have a rank, grade, and/or score, for example, a value of 0, 25, or 1500, where a value of 0 is the best ranking and/or grading and a value of 1500 represents the worst ranking and/or grading for the region/area. Table 9 provides a breakdown of how the region/areas R10, R11, R12, R13, and R18 are graded, ranked, and/or scored based on a comparison evaluating a percent match to Golden, which refers to a registered image without defects.

TABLE 9

| Comparison | % Match | Rank |
|---|---|---|
| % Match to Golden | <60 | 1500 |
| % Match to Golden | 60 < Value < 95 | 25 |
| % Match to Golden | >95 | 0 |

Figure 11:
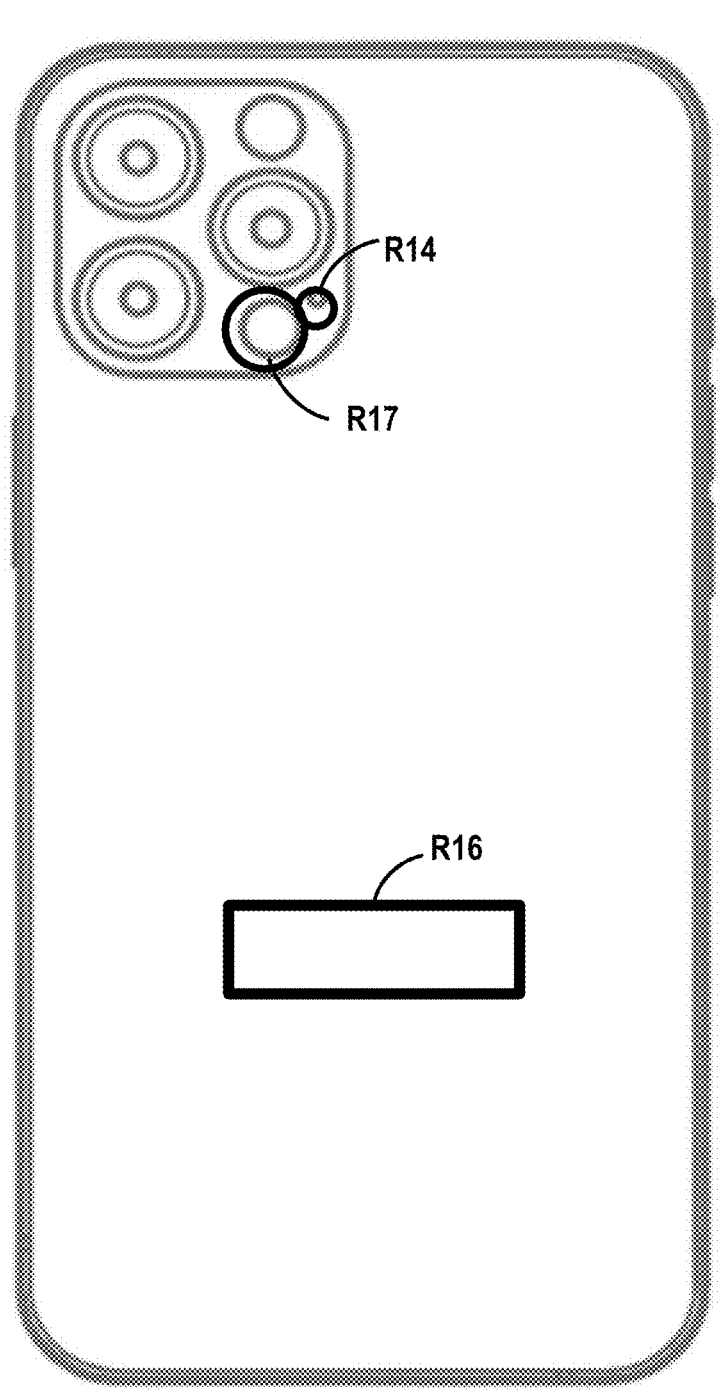

FIG. 11 shows an example back-side analysis of a back housing microphone, artwork, and a LiDAR sensor of a mobile device 103. The region/area comprising the microphone, artwork area, and a LiDAR sensor may be denoted R14, R16, and R17, respectively. The system 100 (FIG. 1A) may capture a back camera image of the mobile device 103, for example via the camera 107, as the mobile device 103 traverses the conveyor belt 101 and/or is manipulated by the robotic arm 120. The camera 107 (and associated lighting to illuminate the surface of the mobile device 103, etc.) may be triggered and/or caused to capture image data when the mobile device 103 reaches a sensor and/or the like along the path of the conveyor belt 101. Image data of the microphone, artwork area, and a LiDAR sensor may be analyzed to determine if the mobile device 103 has any defect, damages, and/or the like. The pass/fail controller 113 may analyze image data including the regions/areas R14, R16, and R17 to determine the presence of defects per region of the back housing. R14, R16, and R17 may each have a rank, grade, and/or score, for example, a value from 0-5, where a value of 0 is the best ranking and/or grading and a value of 5 represents the worst ranking and/or grading for the region/area. Table 10 provides a breakdown of how the regions/areas R14, R16, and R17 are graded, ranked, and/or scored based on a comparison evaluating a percent match to Golden, which refers to a registered image without defects.

TABLE 10

| Comparison | % Match | Rank |
|---|---|---|
| % Match to Golden | 90% | 0 |
| % Match to Golden | <90% | 5 |

Figure 12:
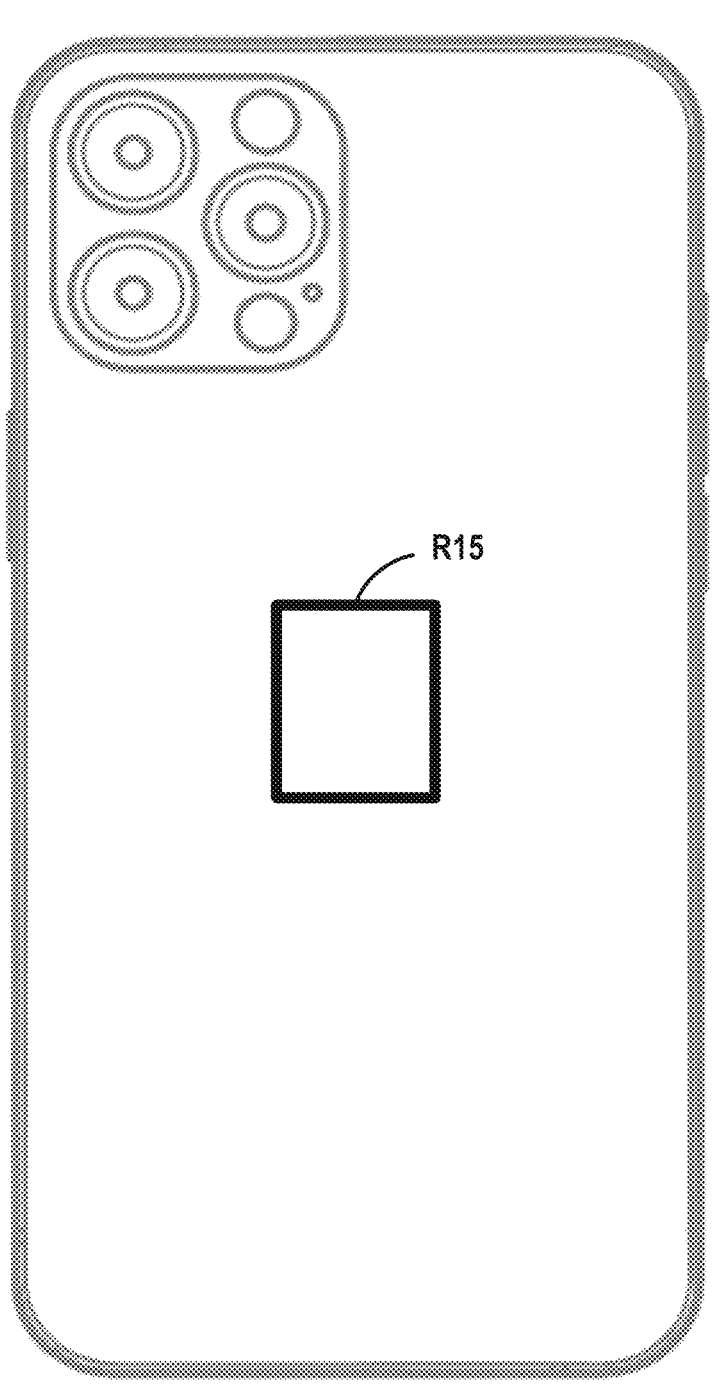

FIG. 12 shows an example backside analysis of a back housing logo area, trademark, insignia, and/or any other type of text and/or imagery of a mobile device 103. The region/area comprising the back housing logo, trademark, insignia, and/or any other type of text and/or imagery may be denoted R15. The system 100 (FIG. 1A) may capture a backside camera image of the mobile device 103, for example via the camera 107, as the mobile device traverses the conveyor belt 101 and/or is manipulated by the robotic arm 120. The camera 107 (and associated lighting to illuminate the surface of the mobile device 103, etc.) may be triggered and/or caused to capture image data when the mobile device 103 reaches a sensor and/or the like along the path of the conveyor belt 101 and/or is manipulated by the robotic arm 120. Image data of the back housing logo, trademark, insignia, and/or any other type of text and/or imagery may be analyzed to determine if the mobile device 103 has any defect, damages, and/or the like. The pass/fail controller 113 may analyze image data including the region/area R15 to determine the presence of defects. R15 may have a rank, grade, and/or score, for example, from 0-25 where a value of 0 is the best ranking and/or grading and a value of 25 represents the worst ranking and/or grading for the region/area. Table 11 provides a breakdown of how the region/area R15 is graded, ranked, and/or scored based on a comparison evaluating a percent match to Golden, which refers to a registered image without defects.

TABLE 11

| Comparison | % Match | Rank |
|---|---|---|
| % Match to Golden | <60 | 25 |
| % Match to Golden | 60 < Value < 90 | 5 |
| % Match to Golden | >90 | 0 |

Table 12 shows a breakdown of the example ranking for a bottom edge (e.g., 0-100 as indicated by Table 1, etc.) of a mobile device 103 based on a side view (bottom-side) analysis of image data (e.g., image data captured/determined by the camera 108, etc.) of a mobile device 103. As shown in Table 12, the letter "R" is used to denote that the associated ranking value is for a "region" of the bottom-side of a mobile device 103, for example, a bottom edge.

TABLE 12

| Region | Rank |
|---|---|
| R1-R3 - Bottom Enclosure | 0-75 |
| R4 - Left Speaker | 0-5 |
| R5 - Left Screw | 0-5 |
| R6 - Lightning Connector | 0-5 |
| R7 - Right Screw | 0-5 |
| R8 - Right Speaker | 0-5 |
| Grand Total | 0-100 |

Figure 13:
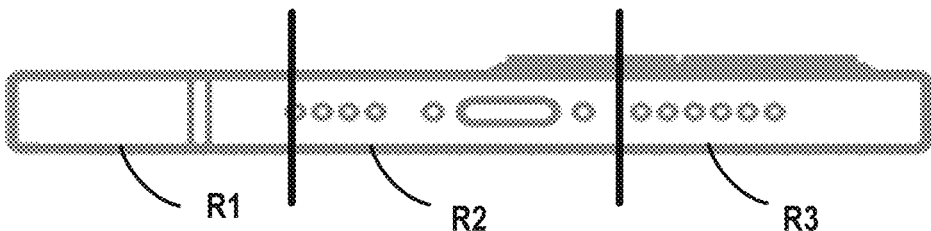

FIG. 13 shows an example side view analysis of a bottom-side of a mobile device 103. The system 100 (FIG. 1A) may capture a bottom-side image of the mobile device 103, for example via the camera 108, as the mobile device traverses the conveyor belt 101. The camera 108 (and associated lighting to illuminate the surface of the mobile device 103, etc.) may be triggered and/or caused to capture image data when the mobile device 103 reaches a sensor and/or the like along the path of the conveyor belt 101 and/or is manipulated by the robotic arm 120. The bottom-side image of the mobile device 103 may be partitioned and/or divided into 3 regions R1, R2, R3, where the letter "R" is used to reference the regions of the bottom-side. Each region (R1, R2, R3) may be analyzed separately by the pass/fail controller 113 to determine the number of defects, such as the top 10 defects, per region of the back housing. The system 100 may capture (via image data) and/or determine the area of the region where each of the top 10 defects is found/located. Each region (R1, R2, R3) may be ranked and/or graded based on the area of the defects and the number of defects. The ranking and/or grading for R1, R2, R3 may be, for example, 0 or 25, where a value of 0 is the best ranking and/or grading and a value of 25 represents the worst ranking and/or grading for the region/area. A perfect mobile device 103 may receive a value of 0 and the worst value a mobile device 103 may receive is 75 for R1, R2, R3 combined. Table 13 provides a breakdown of how regions for the back housing of a mobile device 103 are graded, ranked, and/or scored.

TABLE 13

| Area | Count | Rank |
|---|---|---|
| >500 | Min 3 | 25 |
| <500 | Max 3 | 0 |

Figure 14:
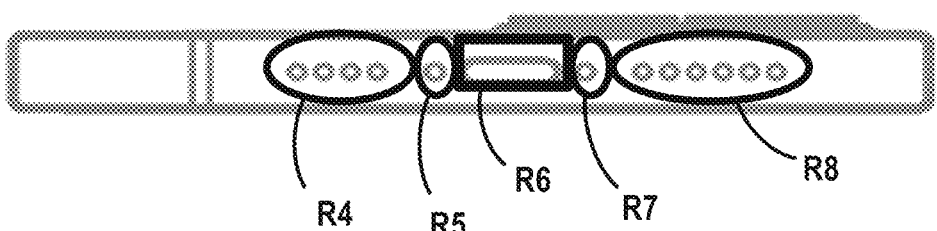

FIG. 14 shows an example side view analysis of a bottom-side left speaker, left screw, lightning connector, right screw, and right speaker of a mobile device 103. The system 100 (FIG. 1A) may capture a bottom-side image of the mobile device 103, for example via the camera 108, as the mobile device traverses the conveyor belt 101. The camera 108 (and associated lighting to illuminate the surface of the mobile device 103, etc.) may be triggered and/or caused to capture image data when the mobile device 103 reaches a sensor and/or the like along the path of the conveyor belt 101 and/or is manipulated by the robotic arm 120. The bottom-side left speaker, left screw, lightning connector, right screw, and right speaker image of the mobile device 103 may be partitioned and/or divided into regions R4-R8, where the letter "R" is used to reference the regions of the bottom-side. Each region (R4-R8) may be analyzed based on a percentage (percent match). The ranking and/or grading for R4-R8 may be, for example, 0 or 5, where a value of 0 is the best ranking and/or grading and a value of 5 represents the worst ranking and/or grading for the region/area. Table 14 provides a breakdown of how regions for the bottom-side left speaker, left screw, lightning connector, right screw, and right speaker of a mobile device 103 are graded, ranked, and/or scored based on a comparison evaluating a percent match to Golden, which refers to a registered image without defects.

TABLE 14

| Comparison | % Match | Rank |
|---|---|---|
| % Match to Golden | <90 | 5 |
| % Match to Golden | >90 | 0 |

Table 15 shows a breakdown of the example ranking for a top edge (e.g., 0-75 as indicated by Table 1, etc.) of a mobile device 103 based on a side view (top-side) analysis of image data (e.g., image data captured/determined by the camera 106, etc.) of a mobile device 103. As shown in Table 15, the letter "R" is used to denote that the associated ranking value is for a "region" of the top-side of a mobile device 103, for example, a top edge.

TABLE 15

| Region | Rank |
|---|---|
| R1-R3 - Top Enclosure | 0-75 |
| Grand Total | 0-75 |

Figure 15:
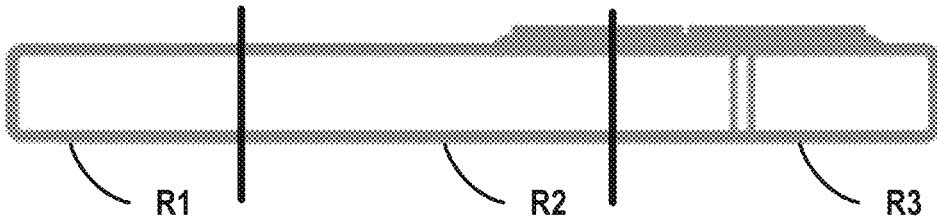

FIG. 15 shows an example side view analysis of a top-edge of a mobile device 103. The system 100 (FIG. 1A) may capture a top-edge image of the mobile device 103, for example via the camera 106, as the mobile device traverses the conveyor belt 101. The camera 106 (and associated lighting to illuminate the surface of the mobile device 103, etc.) may be triggered and/or caused to capture image data when the mobile device 103 reaches a sensor and/or the like along the path of the conveyor belt 101 and/or is manipulated by the robotic arm 120. The top-edge image of the mobile device 103 may be partitioned and/or divided into 3 regions R1, R2, R3, where the letter "R" is used to reference the regions of the top edge. Each region (R1, R2, R3) may be analyzed separately by the pass/fail controller 113 to determine the number of defects, such as the top 10 defects, per region of the back housing. The system 100 may capture (via image data) and/or determine the area of the region where each of the top 10 defects is found/located. Each region (R1, R2, R3) may be ranked and/or graded based on the area of the defects and the number of defects. The ranking and/or grading for R1, R2, R3 may be, for example, 0 or 25, where a value of 0 is the best ranking and/or grading and a value of 25 represents the worst ranking and/or grading for the region/area. A perfect mobile device 103 may receive a value of 0 and the worst value a mobile device 103 may receive is 75, for example, R1, R2, R3 combined. Table 16 provides a breakdown of how regions for the top edge of a mobile device 103 are graded, ranked, and/or scored.

TABLE 16

| Area | Count | Rank |
|---|---|---|
| >500 | Min 3 | 25 |
| <500 | Max 3 | 0 |

Table 17 shows a breakdown of the example ranking for a left edge (e.g., 0-95 as indicated by Table 1, etc.) of a mobile device 103 based on a side view (left-side) analysis of image data (e.g., image data captured/determined by the camera 106, etc.) of a mobile device 103. As shown in Table 17, the letter "R" is used to denote that the associated ranking value is for a "region" of the left-side of a mobile device 103, for example, a left edge.

TABLE 17

| Region | Rank |
|---|---|
| R1-R3 - Left Enclosure | 0-75 |
| R4 - Ringer Switch | 0-5 |
| R5 - Volume UP Button | 0-5 |

TABLE 17-continued

| Region | Rank |
|---|---|
| R6 - Volume Down Button | 0-5 |
| R7 - SIM Tray Left Side | 0-5 |
| Grand Total | 0-95 |

Figure 16:
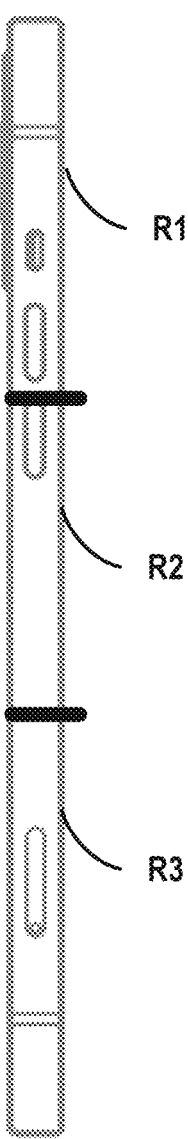

FIG. 16 shows an example side view analysis of the left side of a mobile device 103. The system 100 (FIG. 1A) may capture an image of the left side of a mobile device 103, for example via the camera 106, as the mobile device traverses the conveyor belt 101. The camera 106 (and associated lighting to illuminate the surface of the mobile device 103, etc.) may be triggered and/or caused to capture image data when the mobile device 103 reaches a sensor and/or the like along the path of the conveyor belt 101 and/or is manipulated by the robotic arm 120. The image of the left side of the mobile device 103 may be partitioned and/or divided into 3 regions R1, R2, R3, where the letter "R" is used to reference the regions of the left side (left edge). Each region (R1, R2, R3) may be analyzed separately by the pass/fail controller 113 to determine the number of defects, such as the top 10 defects, per region of the back housing. The system 100 may capture (via image data) and/or determine the area of the region where each of the top 10 defects is found/located. Each region (R1, R2, R3) may be ranked and/or graded based on the area of the defects and the number of defects. The ranking and/or grading for R1, R2, R3 may be, for example, 0 or 25, where a value of 0 is the best ranking and/or grading and a value of 25 represents the worst ranking and/or grading for the region/area. A perfect mobile device 103 may receive a value of 0 and the worst value a mobile device 103 may receive is 75, for example, R1, R2, R3 combined. Table 18 provides a breakdown of how regions for the left side/edge of a mobile device 103 are graded, ranked, and/or scored.

TABLE 18

| Area | Count | Rank |
|---|---|---|
| >500 | Min 3 | 25 |
| <500 | Max 3 | 0 |

Figure 17:
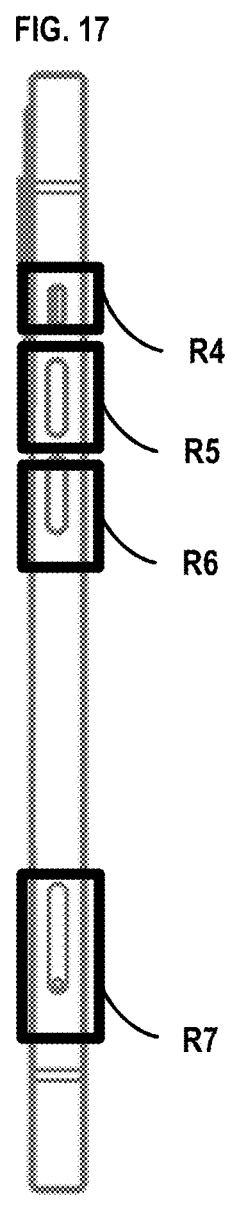

FIG. 17 shows an example side view analysis of a left-side ringer switch, a volume up button, a volume down button, and a subscriber identity module (SIM) of a mobile device 103. The system 100 (FIG. 1A) may capture a left-side image of the mobile device 103, for example via the camera 106, as the mobile device traverses the conveyor belt 101. The camera 106 (and associated lighting to illuminate the surface of the mobile device 103, etc.) may be triggered and/or caused to capture image data when the mobile device 103 reaches a sensor and/or the like along the path of the conveyor belt 101 and/or is manipulated by the robotic arm 120. The left-side ringer switch, a volume up button, a volume down button, and a subscriber identity module (SIM) image of the mobile device 103 may be partitioned and/or divided into regions R4-R7, where the letter "R" is used to reference the "regions" of the left-side. The system 100 may capture (via image data) and/or determine the area of the region where each of the top 10 defects is found/located. Each region (R4-R7) may be ranked and/or graded based on defects. The ranking and/or grading for R4-R7 may be, for example, 0 or 5, where a value of 0 is the best ranking and/or grading and a value of 5 represents the worst ranking and/or grading for the region/area. Table 19 provides a breakdown of how regions for the left-side ringer switch, the volume up button, the volume down button, and the SIM of a mobile device 103 are graded, ranked, and/or scored.

TABLE 19

| Area | Count | Rank |
|---|---|---|
| >500 | Min 2 | 5 |
| <500 | Max 2 | 0 |

Table 20 shows a breakdown of the example ranking for a right edge (e.g., 0-85 as indicated by Table 1, etc.) of a mobile device 103 based on a side view (right-side) analysis of image data (e.g., image data captured/determined by the camera 108, etc.) of a mobile device 103. As shown in Table 20, the letter "R" is used to denote that the associated ranking value is for a "region" of the right-side of a mobile device 103, for example, a right edge.

TABLE 20

| Region | Rank |
|---|---|
| R1-R3 - Right Enclosure | 0-75 |
| R4 - Power Button | 0-5 |
| R5 - SIM Tray/Antenna | 0-5 |
| Grand Total | 0-85 |

Figure 18:
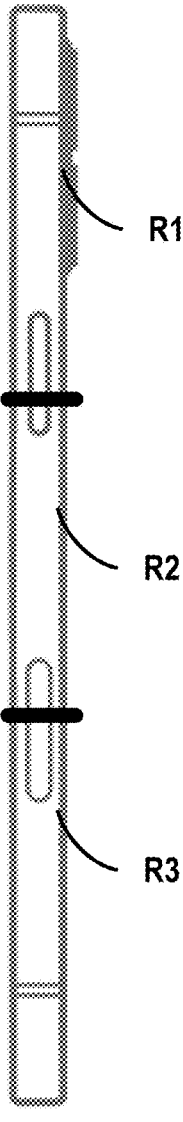

FIG. 18 shows an example side view analysis of the right side of a mobile device 103. The system 100 (FIG. 1A) may capture an image of the right side of a mobile device 103, for example via the camera 108, as the mobile device traverses the conveyor belt 101. The camera 108 (and associated lighting to illuminate the surface of the mobile device 103, etc.) may be triggered and/or caused to capture image data when the mobile device 103 reaches a sensor and/or the like along the path of the conveyor belt 101 and/or is manipulated by the robotic arm 120. The image of the right side/edge of the mobile device 103 may be partitioned and/or divided into 3 regions R1, R2, R3, where the letter "R" is used to reference the regions of the right side. Each region (R1, R2, R3) may be analyzed separately by the pass/fail controller 113 to determine the number of defects, such as the top 10 defects, per region of the back housing. The system 100 may capture (via image data) and/or determine the area of the region where each of the top 10 defects is found/located. Each region (R1, R2, R3) may be ranked and/or graded based on the area of the defects and the number of defects. The ranking and/or grading for R1, R2, R3 may be, for example, 0 or 25, where a value of 0 is the best ranking and/or grading and a value of 25 represents the worst ranking and/or grading for the region/area. A perfect mobile device 103 may receive a value of 0 and the worst value a mobile device 103 may receive is 75, for example, R1, R2, R3 combined. Table 21 provides a breakdown of how regions for the right side/edge of a mobile device 103 are graded, ranked, and/or scored.

TABLE 21

| Area | Count | Rank |
|---|---|---|
| >500 | Min 3 | 25 |
| <500 | Max 3 | 0 |

Figure 19:
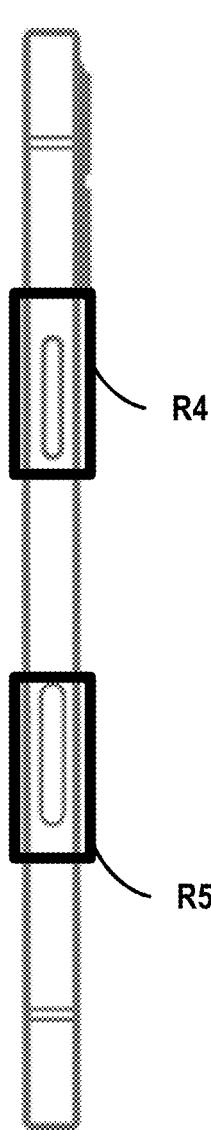
Figure 20:
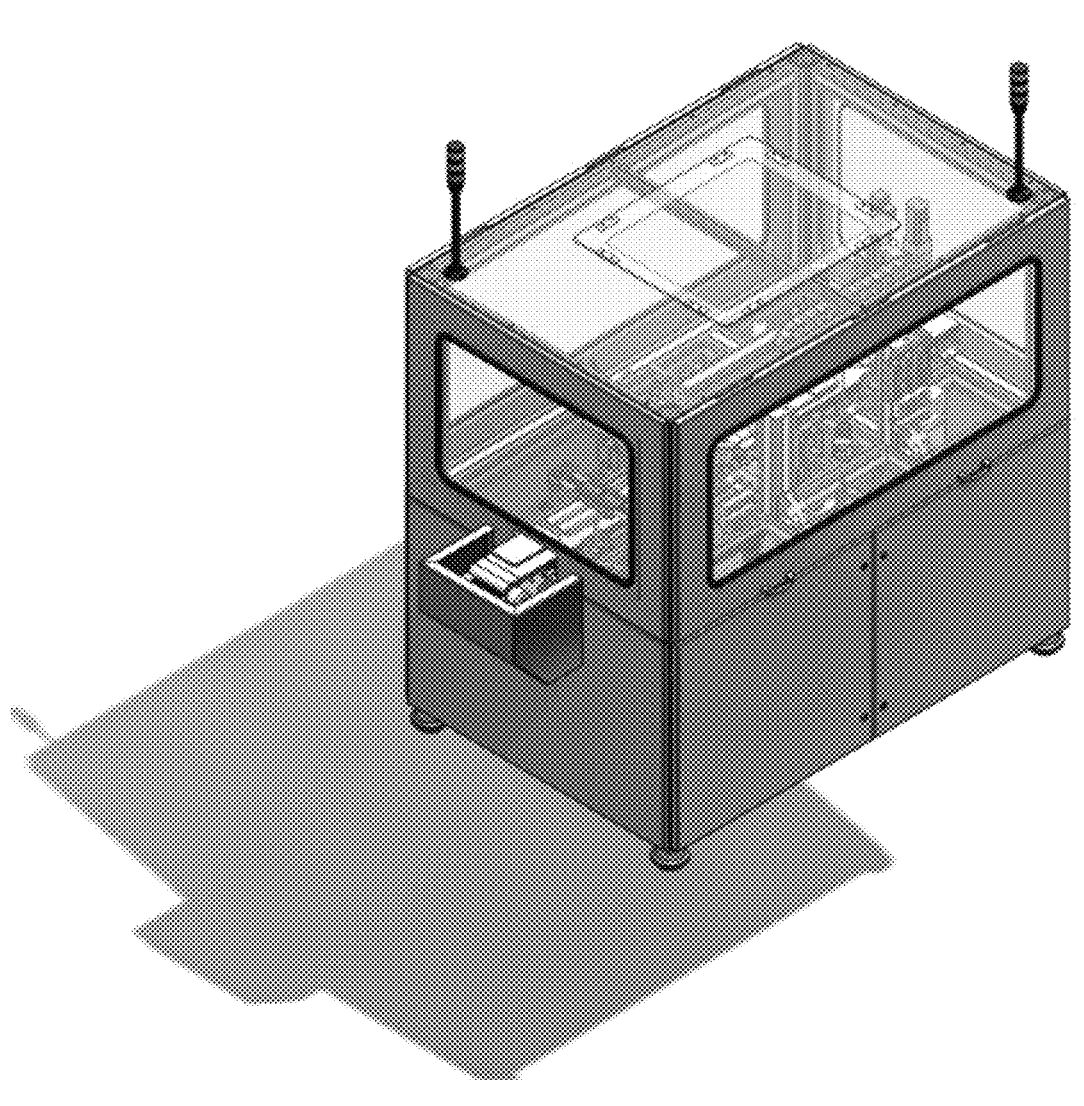
FIGS. 20-23 show an example system for grading user devices.

FIG. 19 shows an example side view analysis of a right-side power button and SIM tray/antenna location of a mobile device 103. The system 100 (FIG. 1A) may capture a right-side image of the mobile device 103, for example via the camera 108, as the mobile device traverses the conveyor belt 101. The camera 108 (and associated lighting to illuminate the surface of the mobile device 103, etc.) may be triggered and/or caused to capture image data when the mobile device 103 reaches a sensor and/or the like along the path of the conveyor belt 101 and/or is manipulated by the robotic arm 120. The right-side power button and SIM tray/antenna location of the mobile device 103 may be partitioned and/or divided into regions R4 and R5, where the letter "R" is used to reference the right-side. The system 100 may capture (via image data) and/or determine the area of the region where each of the top 10 defects is found/located. Each region (R4 and R5) may be ranked and/or graded based on defects. The ranking and/or grading for R4 and R5 may be, for example, 0 or 5, where a value of 0 is the best ranking and/or grading and a value of 5 represents the worst ranking and/or grading for the region/area. Table 22 provides a breakdown of how regions for the right-side power button and SIM tray/antenna location of a mobile device 103 are graded, ranked, and/or scored.

TABLE 22

| Area | Count | Rank |
|------|-------|------|
| >500 | Min 2 | 5 |
| <500 | Max 2 | 0 |

Returning to FIG. 1A, the cameras 105-108 and/or the pass/fail controller 113 may output an image and/or image data (e.g., FIGS. 5-19, etc.), and/or one or more notifications to a display 117 (e.g., a monitor, a computing device, etc.). The pass/fail controller 113 may output a result of a determination made by the DDA engine 202 to the display 117. For example, the pass/fail controller 113 may output a ranking and/or grading for a mobile device, as described in Tables 1-22, to the display 117. The ranking and/or grading may be used, for example, by the system 100, to update a device profile associated with a mobile device 103. The updated device profile may indicate the rankings and/or gradings for the mobile device 103. The pass/fail controller 113, based on a determined ranking and/or grading, may determine that a mobile device 103 passes or fails a device inspection.

As described, the system 100 is a modular system that can be manually loaded and unloaded with user devices (e.g., mobile devices, smartphones, IoT devices, electronic devices, etc.) manually, for example via an operator of the system 100, or automatically, for example via an automated conveyor system (e.g., the conveyor belt 101, the robot arm 120, etc.). The infeed and outfeed of the system 100 may be based on hardware, software, and/or a combination of hardware and software modular components that may be readily upgraded, changed, swapped, and/or omitted, based on the type of device being inspected, user preferences, and/or the like. The system 100 is a device-agnostic system that may accommodate inspection and analysis of any type of device. The system 100 enables remote and/or Online Provisioning (OLP), so that user device model information may be received from a remote computing device and ranking/grading criteria may be updated, changed, and/or modified remotely and/or manually. The OLP is a warehouse management system. The system 100 is integrated with OLP via web Application Programming Interfaces (APIs). The OLP shares information about a scanned serial number such as model information and/or inbound channel so the system 100 may automatically adjust the robotic positions, vision system settings, and grading specifications, for example.

Figure 21:
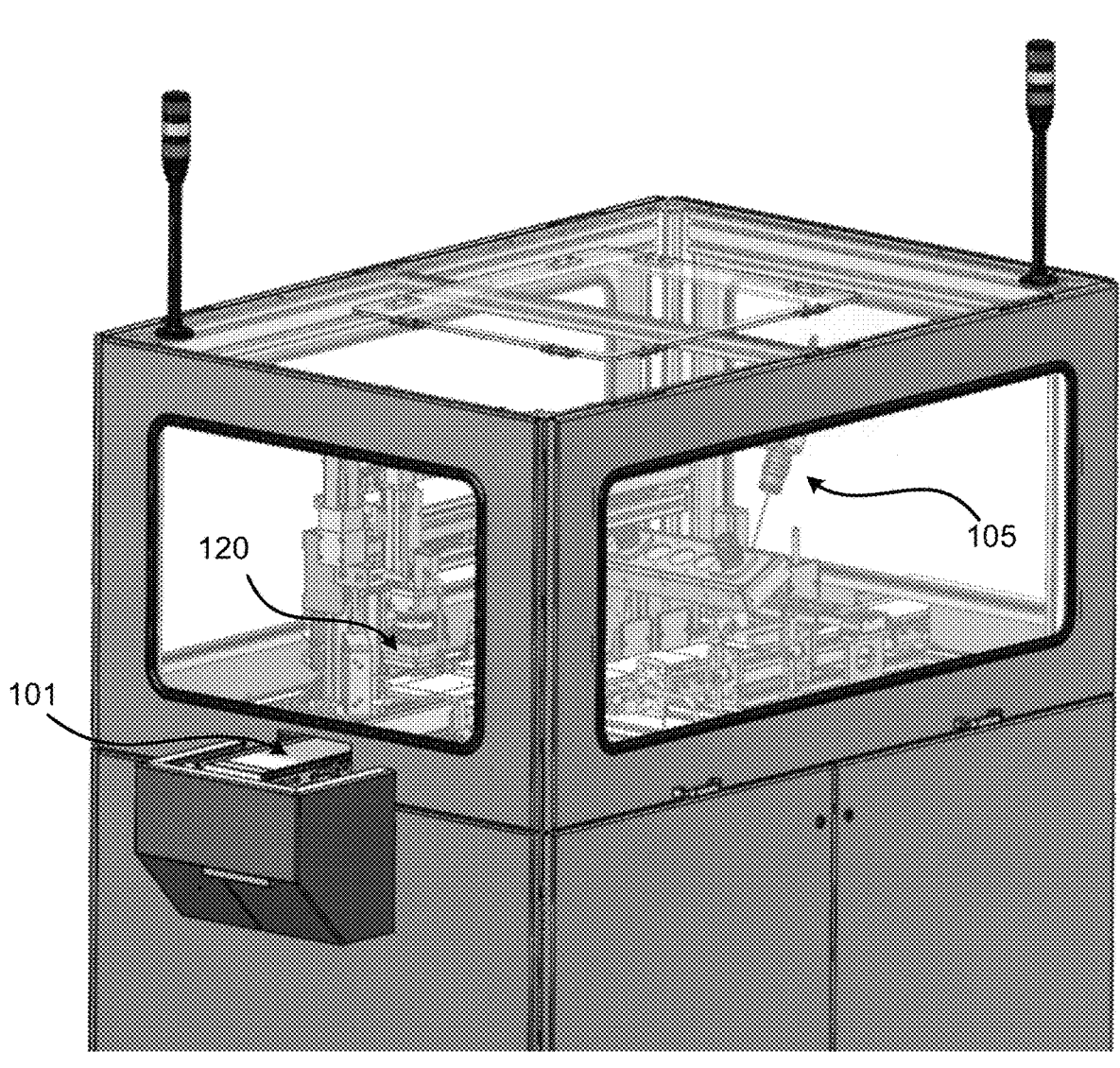
Figure 22:
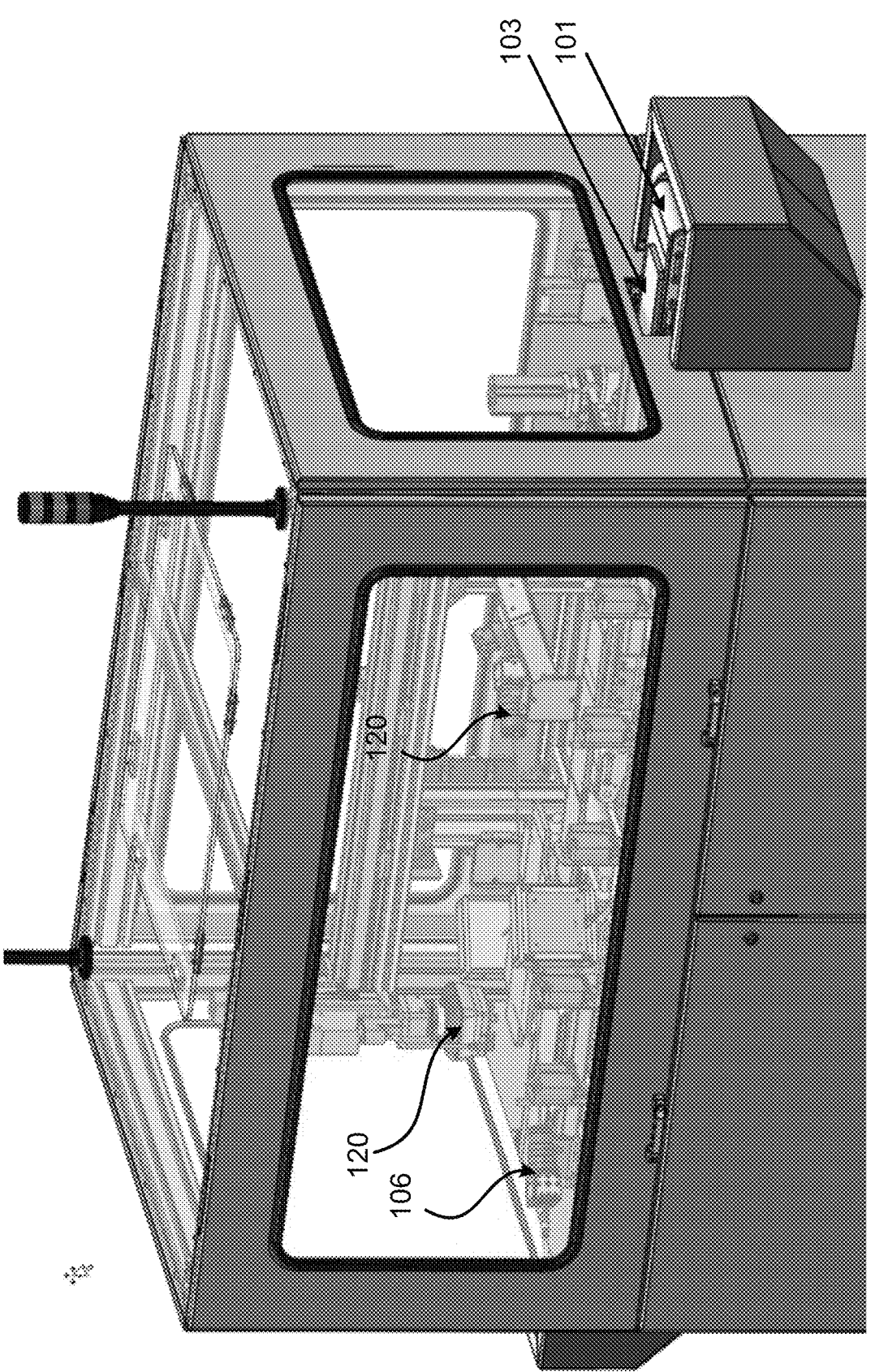
Figure 23:
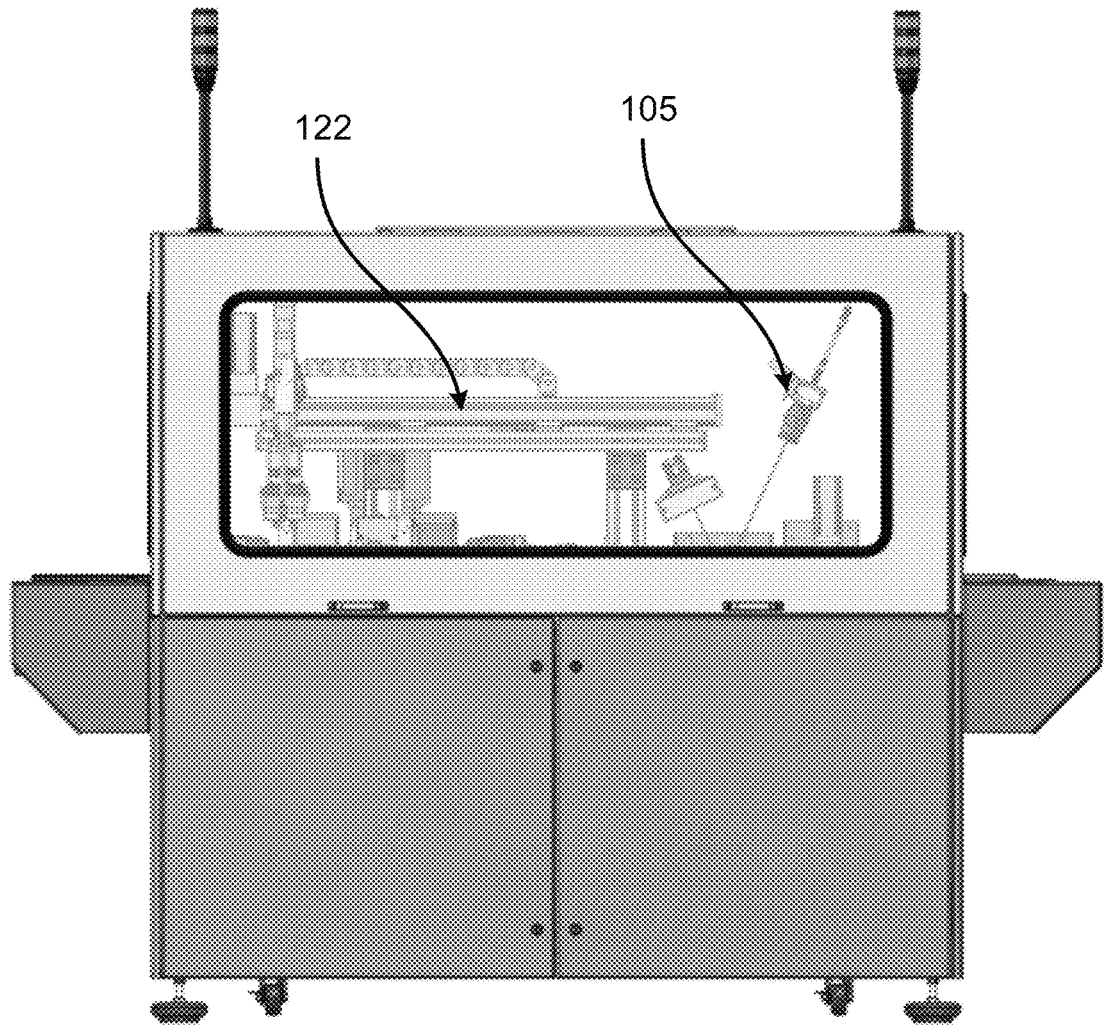

FIGS. 20-23 show example perspective views of an example system 100. The FIGS. 21-23 show various components of the system 100. For example, FIG. 21 shows the camera 105, the conveyor belt 101, and the robotic arm 120. FIG. 22 shows the camera 106, the conveyor belt 101, a mobile device 103, and the robotic arm 120. FIG. 23 shows the camera 105, and the gantry 122.

Figure 24:
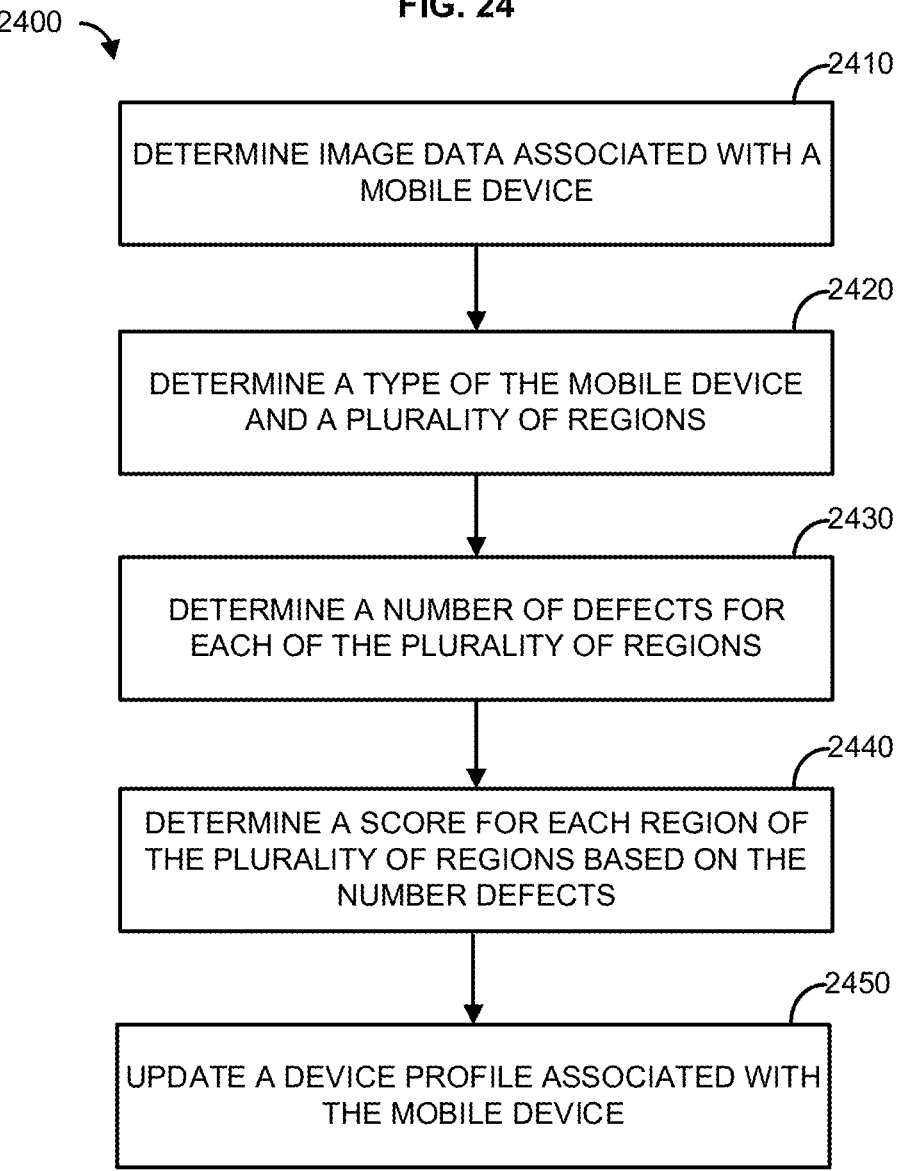
FIG. 24 is a flowchart of an example method for grading user devices.

FIG. 24 is a flowchart of an example method 2400 for grading user devices. The method 2400 may be performed, for example, via the system 100. At 2410, determining image data associated with a mobile device. Determining the image data may include receiving, from an imaging device, based on the mobile device traversing a conveyor, the image data. The imaging device may include one or more of a line scan camera, an area scan camera, a three-dimensional (3D) imaging camera, a laser camera, or a computer vision camera.

At 2420, determining, based on the image data, a type of the mobile device and a plurality of regions. Determining the type of the mobile device may include determining the type of the mobile device from one or more of a barcode or a quick response code indicated by the image data. Determining the type of the mobile device by pulling model information from the OLP through web APIs.

At 2430, determining, for each region of the plurality of regions, a number of defects. Determining the number of defects may be based on one or more of object recognition, computer vision, a trained predictive model, or machine vision (e.g., one or more machine vision methods).

At 2440, determining, for each region of the plurality of regions, a score, wherein the score is based on the type of the mobile device and one or more of: the region, the number of defects for the region, the area of the defects in the region and the type of defects of the region.

At 2450, updating, based on the score for each region of the plurality of regions, a device profile associated with the mobile device. The method 2400 may further include causing display of the score for each region of the plurality of regions. The final scoring grade is calculated and may be saved to the OLP with the device International Mobile Equipment Identity (IMEI) or serial number.

FIG. 25 is a flowchart of an example method 2500 for grading user devices. The method 2500 may be performed, for example, via the system 100. At 2510, determining, for each mobile device of a plurality of mobile devices, image data. Determining, for each mobile device of the plurality of mobile devices the image data, may include receiving, from one more imaging devices, based on the mobile device traversing a conveyor, the image data. The one or more imaging devices comprises one or more of line scan cameras, area scan cameras, three-dimensional (3D) imaging cameras, laser cameras, or computer vision cameras.

At 2520, determining, for each mobile device of the plurality of mobile devices, based on the image data, a type of the mobile device and a plurality of regions. Determining, for each mobile device of the plurality of mobile devices, the type of the mobile device may include determining the type of the mobile device from one or more of a barcode or a quick response code indicated by the image data. Determining, for each mobile device of the plurality of mobile devices, the type of the mobile device may be based on object recognition. Determining the type of each mobile device of the plurality of mobile devices by pulling model information from the OLP through web APIs.

At 2530, determining, for each mobile device of the plurality of mobile devices, for each region of the plurality of regions, a number of defects. Determining, for each mobile device of the plurality of mobile devices, the number of defects may be based on one or more of machine vision methods or object recognition. Determining, for each mobile device of the plurality of mobile devices, the number of defects may be based on an output of a trained predictive model.

At 2540, determining, for each mobile device of the plurality of mobile devices, for each region of the plurality of regions, a score, wherein the score is based on the type of the mobile device and one or more of: the region or the number of defects for the region.

At 2550, updating, for each mobile device of the plurality of mobile devices, based on the score for each region of the plurality of regions, a device profile associated with the mobile device. The final scoring grade is calculated and may be saved to the OLP with the device International Mobile Equipment Identity (IMEI) or serial number.

The method 2500 may further include causing, for each mobile device of the plurality of mobile devices the image data, display of the score for each region of the plurality of regions. The method 2500 may further include determining, based on the scores for two or more mobile devices of the plurality of mobile devices, a group of mobile devices, wherein the scores, for each mobile device of the group of mobile devices, match. The method 2500 may further include causing, for each mobile device of the plurality of mobile devices, display of the score for each region of the plurality of regions.

Figure 26:
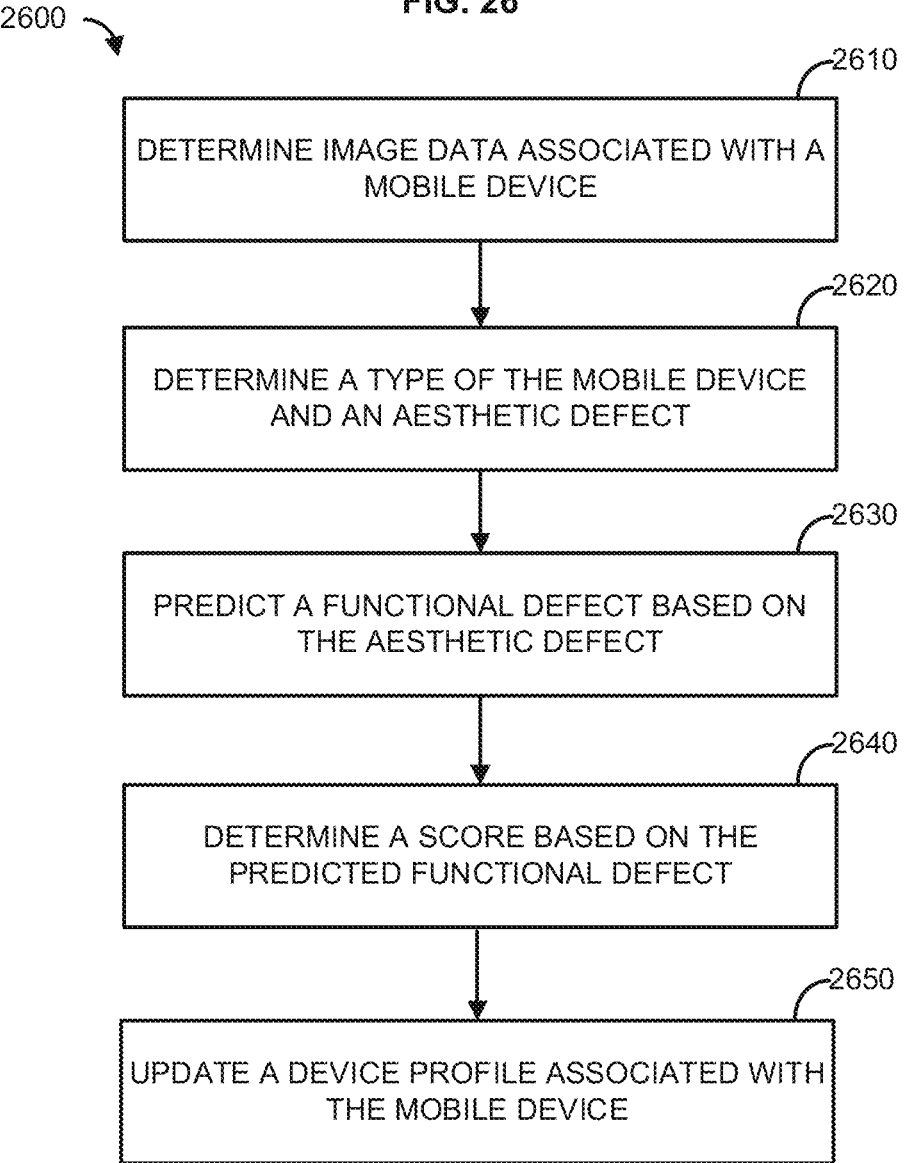
FIG. 26 is a flowchart of an example method for grading user devices.

FIG. 26 is a flowchart of an example method 2600 for grading user devices. The method 2600 may be performed, for example, via the system 100. At 2610, determining image data associated with a mobile device. Determining the image data may include receiving, from an imaging device, based on the mobile device traversing a conveyor, the image data.

At 2620, determining, based on the image data, a type of the mobile device and an aesthetic defect. Determining the type of the mobile device and the aesthetic defect may be based on one or more of machine vision methods or object recognition.

At 2630, predicting, based on the type of the mobile device and the aesthetic defect, a functional defect.

At 2640, determining, based on the predicted functional defect, a score.

At 2650, updating, based on the score, a device profile associated with the mobile device. The method 2600 may further include causing, based on one or more of the predicted functional defect or the score satisfying a threshold, the mobile device to be sent for manual inspection.

Figure 27:
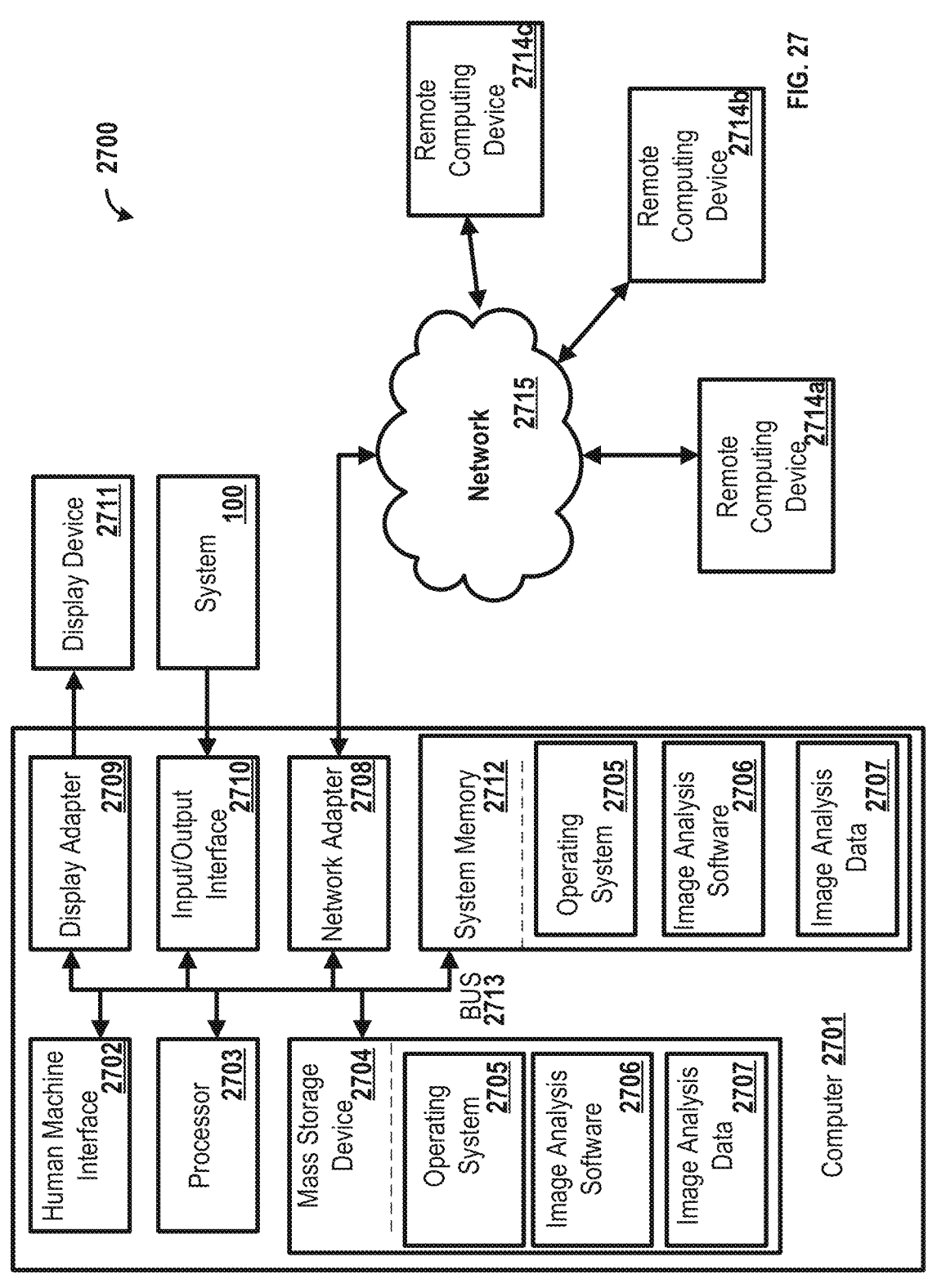
FIG. 27 is an example operating environment for implementing grading of user devices.

In an exemplary aspect, the methods and systems may be implemented on a computer 2701 as illustrated in FIG. 27 and described below. By way of example, the cameras 105-108, the PLC 116, the pass/fail controller 113 (or a component thereof) of FIG. 1, and/or any other device/component described herein may be a computer 2701 as illustrated in FIG. 27. Similarly, the methods and systems disclosed may utilize one or more computers to perform one or more functions in one or more locations. FIG. 27 is a block diagram illustrating an exemplary operating environment 2700 for performing the disclosed methods. This exemplary operating environment 2700 is only an example of an operating environment and is not intended to suggest any limitation as to the scope of use or functionality of operating environment architecture. Neither should the operating environment 2700 be interpreted as having any dependency or requirement relating to any one or combination of components illustrated in the exemplary operating environment 2700.

The present methods and systems may be operational with numerous other general purpose or special purpose computing system environments or configurations. Examples of well known computing systems, environments, and/or configurations that may be suitable for use with the systems and methods comprise, but are not limited to, personal computers, server computers, laptop devices, and multiprocessor systems. Additional examples comprise set top boxes, programmable consumer electronics, network PCs, programmable logic controllers (PLCs), minicomputers, mainframe computers, distributed computing environments that comprise any of the above systems or devices, and the like.

The processing of the disclosed methods and systems may be performed by software components. The disclosed systems and methods may be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods may also be practiced in grid-based and distributed computing environments where tasks are performed by remote processing devices that are linked through a communications network. In a distributed computing environment, program modules may be located in local and/or remote computer storage media including memory storage devices.

Further, one skilled in the art will appreciate that the systems and methods disclosed herein may be implemented via a general-purpose computing device in the form of a computer 2701. The computer 2701 may comprise one or more components, such as one or more processors 2703, a system memory 2712, and a bus 2713 that couples various components of the computer 2701 including the one or more processors 2703 to the system memory 2712. In the case of multiple processors 2703, the system may utilize parallel computing.

The bus 2713 may comprise one or more of several possible types of bus structures, such as a memory bus, memory controller, a peripheral bus, an accelerated graphics port, and a processor or local bus using any of a variety of bus architectures. The bus 2713, and all buses specified in this description may also be implemented over a wired or wireless network connection.

The computer 2701 typically comprises a variety of computer-readable media. Exemplary readable media may be any available media that is accessible by the computer 2701 and comprises, for example, and not meant to be limiting, both volatile and non-volatile media, removable and non-removable media. The system memory 2712 may comprise computer-readable media in the form of volatile memory, such as random access memory (RAM), and/or non-volatile memory, such as read-only memory (ROM). The system memory 2712 typically may comprise data such as image analysis data 2707 and/or program modules such as operating system 2705 and image analysis software 2706 that are accessible to and/or are operated on by the one or more processors 2703.

In another aspect, the computer 2701 may also comprise other removable/non-removable, volatile/non-volatile computer storage media. The mass storage device 2704 may provide non-volatile storage of computer code, computer-readable instructions, data structures, program modules, and other data for the computer 2701. For example, a mass storage device 2704 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 2704, including by way of example, an operating system 2705 and image analysis software 2706. One or more of the operating system 2705 and image analysis software 2706 (or some combination thereof) may comprise elements of the programming and the image analysis software 2706. Image analysis data 2707 may also be stored on the mass storage device 2704. Image analysis data 2707 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple locations within the network 2715.

In another aspect, the user may enter commands and information into the computer 2701 via an input device (not shown). Examples of such input devices comprise, but are not limited to, a keyboard, pointing device (e.g., a computer mouse, remote control), a microphone, a joystick, touch-enabled devices such as a touchscreen, tactile input devices such as gloves and other body coverings, motion sensors, and the like. These and other input devices may be connected to the one or more processors 2703 via a human-machine interface 2702 that is coupled to the bus 2713, but can be connected by other interface and bus structures, such as, but not limited to, a parallel port, game port, an IEEE 1394 Port (also known as a Firewire port), a serial port, network adapter 2708, and/or a universal serial bus (USB).

In yet another aspect, a display device 2711 may also be connected to the bus 2713 via an interface, such as a display adapter 2709. It is contemplated that the computer 2701 may have more than one display adapter 2709 and the computer 2701 may have more than one display device 2711. For example, a display device 2711 may be a monitor, an LCD (Liquid Crystal Display), a light-emitting diode (LED) display, a television, smart lens, smart glass, and/or a projector. In addition to the display device 2711, other output peripheral devices may comprise components such as speakers (not shown) and a printer (not shown) which may be connected to the computer 2701 via Input/Output Interface 2710. Any step and/or result of the methods may be output in any form to an output device. Such output may be any form of visual representation, including, but not limited to, textual, graphical, animation, audio, tactile, and the like. The display 2711 and computer 2701 may be part of one device, or separate devices.

In an aspect, the computer 2701 may be coupled to the system 100 via the Input/Output Interface 2710. The computer 2701 may be configured to monitor and store data. The computer 2701 may be configured to store images acquired by cameras connected to the system 100, store data related to pass/fail data (scores, grades, rankings, etc.) generated during inspections, etc. The computer 2701 may also be used as a programming interface to one or more smart devices (e.g., smart cameras) and/or embedded logic controllers that require customized firmware to operate. The computer 2701 may be used to generate, troubleshoot, upload, and store iterations of this software or firmware.

The computer 2701 may operate in a networked environment using logical connections to one or more remote computing devices 2714*a,b,c*. By way of example, a remote computing device 2714*a,b,c* may be a personal computer, computing station (e.g., workstation), portable computer (e.g., laptop, mobile phone, tablet device), smart device (e.g., smartphone, smartwatch, activity tracker, smart apparel, smart accessory), security and/or monitoring device, a server, a router, a network computer, a peer device, edge device or other common network nodes, and so on. Logical connections between the computer 2701 and a remote computing device 2714*a,b,c* may be made via a network 2715, such as a local area network (LAN) and/or a general wide area network (WAN). Such network connections may be through a network adapter 2708. A network adapter 2708 may be implemented in both wired and wireless environments. Such networking environments are conventional and commonplace in dwellings, offices, enterprise-wide computer networks, intranets, and the Internet. In an aspect, the network adapter 2708 may be configured to provide power to one or more connected devices (e.g., a camera). For example, the network adapter 2708 may adhere to the Power-over-Ethernet (PoE) standard or the like.

For purposes of illustration, application programs and other executable program components such as the operating system 2705 are illustrated herein as discrete blocks, although it is recognized that such programs and components may reside at various times in different storage components of the computing device 2701, and are executed by the one or more processors 2703 of the computer 2701. An implementation of image analysis software 2706 may be stored on or transmitted across some form of computer readable media. Any of the disclosed methods may be performed by computer readable instructions embodied on computer-readable media. Computer-readable media may be any available media that may be accessed by a computer. By way of example and not meant to be limiting, computer-readable media may comprise "computer storage media" and "communications media." "Computer storage media" may comprise volatile and non-volatile, removable and non-removable media implemented in any methods or technology for storage of information such as computer-readable instructions, data structures, program modules, or other data. Exemplary computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

The methods and systems may employ artificial intelligence (AI) techniques such as machine learning and iterative learning. Examples of such techniques include, but are not limited to, expert systems, case-based reasoning, Bayesian networks, behavior-based AI, neural networks, fuzzy systems, evolutionary computation (e.g., genetic algorithms), swarm intelligence (e.g., ant algorithms), and hybrid intelligent systems (e.g., Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
determining image data associated with a mobile device, wherein the image data is determined using computer vision; and
wherein the image data includes images from at least each of: the front, back, and sides of a mobile device;
determining, based on the image data, a type of the mobile device;
determining for the image data of each the front, back, and each side of the mobile device a plurality of fixed regions, wherein the regions are defined by a grid pattern; and
wherein at least the buttons, lenses, speakers, and microphones are separated into regions separately from the grid pattern;
wherein the plurality of regions includes the regions defined by the grid pattern and the separated regions;
determining, for each region of the plurality of regions, a number of defects;
determining, for each defect a size of the defect;
determining, for each region of the plurality of regions, a numerical score, wherein the numerical score is based on the type of the mobile device and a combination of the number of defects and the size of the defect;
determining a total numerical score for the mobile device based on the numerical score of each region;
converting the numerical score to a letter grade; and
updating, based on the numerical score and letter grade for each region of the plurality of regions, a device profile associated with the mobile device.

2. The method of claim 1, wherein determining the image data comprises receiving, from an imaging device, based on the mobile device traversing a conveyor, the image data.

3. The method of claim 2, wherein the imaging device comprises one or more of a line scan camera, an area scan camera, a three-dimensional (3D) imaging camera, or a laser camera.

4. The method of claim 1, wherein determining the type of the mobile device comprises determining the type of the mobile device from one or more of a barcode or a quick response code indicated by the image data.

5. The method of claim 1, wherein determining the type of the mobile device is based on object recognition.

6. The method of claim 1, further comprising causing display of the score for each region of the plurality of regions.

7. The method of claim 1, further comprising: determining a type of defect.

8. The method of claim 7, further comprising: predicting a functional defect of a mobile device based on the type of defect and the region of the defect.

9. The method of claim 1, further comprising: determining, by at least one of a user, a preselected criteria, or an algorithm, a minimum acceptable grade for the mobile device.

10. The method of claim 9, further comprising: selecting defect types and regions which automatically produce an unwanted grade for the mobile device;
wherein the unwanted grade range is set by at least one of a user, a preselected criteria, or an algorithm.

11. The method of claim 10, further comprising: prior to determining a grade for the mobile device, determining if any defect will produce a grade below the minimum acceptable grade.

12. A method comprising:
determining, for each mobile device of a plurality of mobile devices, image data,
wherein the image data is determined using computer vision; and
wherein the image data includes images from at least each of: the front, back, and sides of a mobile device;
determining, for each mobile device of the plurality of mobile devices, based on the image data, a type of the mobile device;
determining for the image data of each of the front, back, and each side of each of the plurality of mobile devices a plurality of fixed regions, wherein the regions are defined by a grid pattern; and
wherein buttons, lenses, speakers, and microphones are separated into regions separately from the grid pattern;
wherein the plurality of regions includes the regions defined by the grid pattern and the separated regions;
determining, for each mobile device of the plurality of mobile devices, for each region of the plurality of regions, a number of defects;
determining, for each defect a size of the defect;
determining, for each mobile device of the plurality of mobile devices, for each region of the plurality of regions, a numerical score, wherein the numerical score is based on the type of the mobile device a combination of the number of defects and the size of the defect;
determining a total numerical score for each mobile device of the plurality of mobile devices based on the numerical score of each region of the mobile device receiving the total score;
converting the numerical score to a letter grade; and
updating, for each mobile device of the plurality of mobile devices, based on the numerical score and letter grade for each region of the plurality of regions, a device profile associated with the mobile device.

13. The method of claim 12, wherein determining, for each mobile device of the plurality of mobile devices, the image data comprises determining, for each mobile device, the image data from an imaging device while each mobile device is traversing a conveyor.

14. The method of claim 13, wherein the imaging device comprises one or more of a line scan camera, an area scan camera, a three-dimensional (3D) imaging camera, or a laser camera.

15. The method of claim 12, wherein determining, for each mobile device of the plurality of mobile devices, the type of the mobile device comprises determining the type of the mobile device from one or more of a barcode or a quick response code indicated by the image data.

16. The method of claim 12, wherein determining, for each mobile device of the plurality of mobile devices, the type of the mobile device is based on object recognition.

17. The method of claim 12, further comprising causing, for each mobile device of the plurality of mobile devices, display of the score for each region of the plurality of regions.

18. The method of claim 12, further comprising determining, based on the scores for two or more mobile devices of the plurality of mobile devices, a group of mobile devices, wherein the scores, for each mobile device of the group of mobile devices, match.

* * * * *